(12) United States Patent
Jeong et al.

(10) Patent No.: US 10,659,989 B2
(45) Date of Patent: *May 19, 2020

(54) METHOD AND DEVICE FOR CONTROLLING CONGESTION IN MOBILE COMMUNICATION SYSTEM

(71) Applicant: Samsung Electronics Co., Ltd., Suwon-si, Gyeonggi-do (KR)

(72) Inventors: Sangsoo Jeong, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,193

(22) Filed: Jun. 3, 2019

(65) Prior Publication Data

US 2019/0289493 A1    Sep. 19, 2019

Related U.S. Application Data

(63) Continuation of application No. 15/990,320, filed on May 25, 2018, now Pat. No. 10,313,921, which is a
(Continued)

(30) Foreign Application Priority Data

| Dec. 20, 2013 | (KR) | .................... | 10-2013-0160558 |
| Jul. 29, 2014 | (KR) | .................... | 10-2014-0096529 |
| Nov. 10, 2014 | (KR) | .................... | 10-2014-0155666 |

(51) Int. Cl.
*H04W 72/00* (2009.01)
*H04W 28/02* (2009.01)
(Continued)

(52) U.S. Cl.
CPC ..... *H04W 28/0289* (2013.01); *H04L 61/6054* (2013.01); *H04W 12/04* (2013.01); *H04W 88/14* (2013.01)

(58) Field of Classification Search
CPC . H04W 28/0289; H04W 88/14; H04W 12/04; H04L 61/6054
(Continued)

(56) References Cited

U.S. PATENT DOCUMENTS 8,467,351 B2    6/2013 Liu et al.
8,867,362 B2   10/2014 De Franca Lima et al.
(Continued)

FOREIGN PATENT DOCUMENTS

CN    103202052 A    7/2013
EP      2663122 A2   11/2013
(Continued)

OTHER PUBLICATIONS

Extended European Search Report for European Application No. 14871792.9, dated Jul. 19, 2017. (7 pages).
(Continued)

*Primary Examiner* — Amancio Gonzalez

(57) ABSTRACT

The present disclosure relates to a method and a device for controlling congestion in a mobile communication system. A method for controlling congestion of a network node according to the present disclosure comprises the steps of: receiving congestion-related information from at least one base station; transmitting a user equipment information request message for making a request for information on a piece of user equipment corresponding to the base station to a mobility management entity; receiving a user equipment information response message including the information on the user equipment corresponding to the base station from the mobility management entity; and transmitting the infor-
(Continued)

mation on the piece of user equipment corresponding to the base station to another core network node.

16 Claims, 16 Drawing Sheets

Related U.S. Application Data continuation of application No. 15/106,798, filed as application No. PCT/KR2014/012643 on Dec. 22, 2014, now Pat. No. 9,986,459.

(51) Int. Cl.
  *H04L 29/12* (2006.01)
  *H04W 88/14* (2009.01)
  *H04W 12/04* (2009.01)
(58) Field of Classification Search
  USPC .......................................................... 455/450
  See application file for complete search history.

(56) References Cited

U.S. PATENT DOCUMENTS

| | | | |
|---|---|---|---|
| 9,026,111 | B2 | 5/2015 | Edwards et al. |
| 9,392,126 | B2 | 7/2016 | Goldner et al. |
| 9,628,941 | B2 | 4/2017 | Kim et al. |
| 9,974,083 | B2 * | 5/2018 | Serravalle ............ H04W 16/14 |
| 9,986,459 | B2 * | 5/2018 | Jeong ................ H04W 28/0289 |
| 10,313,921 | B2 * | 6/2019 | Jeong ................ H04W 28/0289 |
| 2011/0098063 | A1 | 4/2011 | Richardson |
| 2011/0110228 | A1 | 5/2011 | de Franca Lima et al. |
| 2012/0064884 | A1 | 3/2012 | Ramachandran et al. |
| 2012/0182896 | A1 | 7/2012 | Jang et al. |
| 2015/0156666 | A1 | 6/2015 | Won et al. |
| 2016/0050585 | A1 | 2/2016 | Shan |
| 2017/0150395 | A1 | 5/2017 | Karlsson et al. |

FOREIGN PATENT DOCUMENTS

| | | |
|---|---|---|
| KR | 10-2013-0111157 A | 10/2013 |
| WO | 2013/133665 A1 | 9/2013 |
| WO | 2013/172623 A1 | 11/2013 |
| WO | 2013/176473 A1 | 11/2013 |

OTHER PUBLICATIONS

"3rd Generation Partnership Project; Technical Specification Group Services and System Aspects; Study on system enhancements for user plane congestion management (Release 12)", 3GPP Standard; 3GPP TR 23.705, 3rd Generation Partnership Project (3GPP), Mobile Competence Centre; 650, Route Des Lucioles; F-06921 Sophia-Antipolis Cedex; France, vol. SA WG2, No. V0.9.0, Nov. 29, 2013. (58 pages).

International Search Report dated Mar. 30, 2015 in connection with International Patent Application No. PCT/KR2014/012643, 17 pages.

Written Opinion of the International Searching Authority dated Mar. 30, 2015 in connection with International Patent Application No. PCT/KR2014/012643, 5 pages.

Office Action dated Mar. 4, 2019 in connection with Chinese Patent Application No. 201480069978.1, 23 pages.

* cited by examiner

METHOD AND DEVICE FOR CONTROLLING CONGESTION IN MOBILE COMMUNICATION SYSTEM

CROSS-REFERENCE TO RELATED APPLICATIONS

This application is a continuation of U.S. patent application Ser. No. 15/990,320, filed May 25, 2018, which is a continuation of U.S. patent application Ser. No. 15/106,798 filed Jun. 20, 2016, now U.S. Pat. No. 9,986,459, which is a 371 of International Patent Application No. PCT/KR2014/012643 filed Dec. 22, 2014, which claims priority to Korean Patent Application Nos. 10-2013-0160558 filed Dec. 20, 2013, 10-2014-0096529 filed Jul. 29, 2014, and 10-2014-0155666 filed Nov. 10, 2014, the disclosures of which are herein incorporated by reference in their entirety.

1. TECHNICAL FIELD

The present disclosure relates to a mobile communication network, and more particularly to a method and device for controlling congestion.

2. BACKGROUND

Mobile communication systems have primarily been developed to provide voice communication services while guaranteeing user mobility. Mobile communication systems have gradually extended the communication service area thereof to high-speed data communication services in addition to voice communication services. However, due to a lack of resources and a demand for higher-speed communication services from users in currently available mobile communication systems, an enhanced mobile communication system is required.

To meet such requirements, Long Term Evolution (LTE), as one next-generation mobile communication system under development, is being standardized in the 3rd Generation Partnership Project (3GPP). LTE is technology for implementing high-speed packet-based communication at a transfer rate of up to about 100 Mbps. Several methods are being discussed to implement high-speed packet-based communication. Examples of such methods include reducing the number of nodes on a communication path by simplifying the architecture of a network and maximally approximating radio protocols to radio channels.

FIG. 1 is a view illustrating the structure of a typical LTE mobile communication system.

Referring to FIG. 1, a radio access network of an LTE mobile communication system may include next-generation base stations (Evolved Node Bs, EUTRAN, hereinafter referred to as eNBs or Node Bs) 110, a Mobility Management Entity (MME) 120 and a Serving Gateway (S-GW) 130.

A piece of user equipment (hereinafter, referred to as a UE) 100 accesses an external network via an eNB, the S-GW, and a P-GW (PDN Gateway (Packet Data Network Gateway)).

The eNB 110, which is a Radio Access Network (RAN) node, corresponds to the Radio Network Controller (RNC) of the Universal Terrestrial Radio Access Network (UTRAN) system and the Base Station Controller (BSC) of the GSM EDGE Radio Access Network (GERAN) system. The eNB 110 connects to the UE 100 over a radio channel and performs a function similar to that of the legacy RNC/BSC. The eNB may use several cells at the same time.

In LTE, not only real-time services such as VoIP (Voice over IP) using the Internet protocol, but also all user traffic are provided over a shared channel. Accordingly, a device to perform scheduling by collecting status information of UEs is needed, and the eNB serves as this device.

The MME 120 is responsible for various control functions. One MME may connect to multiple eNBs.

The S-GW 130, which is a device for providing a data bearer, is controlled by the MME 120 to generate or delete a data bearer.

The core network of the LTE mobile communication system may further include nodes such as an Application Function, a PCRF and a P-GW (not shown) in addition to the MME 120 and the S-GW 130.

The Application Function (AF) is a device for exchanging application-related information with a user at the application level.

The PCRF (Policy Charging and Rules Function) is a device for controlling a policy associated with the Quality of Service (QoS) for the user, and a PCC (Policy and Charging Control) rule corresponding to the policy is delivered to the P-GW and applied. The PCRF (Policy Charging and Rules Function) is an entity for comprehensively controlling QoS and charging for traffic.

A path connecting the UE 100 to a RAN node 110, the RAN node 110 to the S-GW 130, and the S-GW 130 to a P-GW 160, through which user data is transmitted/received is generally referred to as a user plane (UP). In a UP path, a link between the UE 100 and the RAN node 110 uses a radio channel subjected to heavy resource restriction.

In a wireless communication system such as LTE, QoS may be applied in units of Evolved Packet System (EPS) bearers. One EPS bearer is used to transport IP flows having the same QoS requirements. QoS-related parameters may be designated for the EPS bearer. The QoS-related parameters include a QoS Class Identifier (QCI) and an Allocation and Retention Priority (ARP). The QCI is a parameter that defines a QoS priority with an integer, and the ARP is a parameter to determine whether to allow or reject generation of a new EPS bearer.

The EPS bearer corresponds to a Packet Data Protocol (PDP) context in a General Packet Radio Service (GPRS) system. One EPS bearer belongs to a PDN connection, which may have an Access Point Name (APN) as an attribute. To generate a PDN connection for an IP Multimedia Subsystem (IMS) service such as Voice over LTE (VoLTE), a well-known IMS APN needs to be used.

To support voice calls in the LTE network, IMS-based VoLTE may be used according to a Packet Switched (PS) scheme, or CS fall back (CSFB) reusing a Circuit Switched (CS) scheme of the 2G/3G system may be used. In the LTE network, VoLTE may be a term having the same concept as Voice over IMS (VoIMS).

In a wireless communication system, particularly, the LTE system, when an incoming or outgoing voice call occurs while a UE is using an LTE network, a CSFB process of switching to a Circuit Switched (CS) network is performed for a voice service. In this case, a separate authentication procedure for the UE needs to be performed, and thus delay may occur in providing the voice service. In general, the 2G/3G system is a CS network capable of providing a CS service, and an entity responsible for a control operation related to the CS service is referred to as an MSC or VLR. In LTE, CSFB providing a switching function for the CS service is performed between the MSC/VLR and the MME by utilizing an SGs interface. If congestion occurs in a Radio Access Network (RAN), the occurrence is preferably signaled to a Core Network (CN) to perform further optimized traffic processing.

To apply traffic control for each UE, bearer or service according to congestion, the CN needs to recognize UEs located in a RAN in which congestion is occurring.

DISCLOSURE OF DISCLOSURE

Technical Problem

The present disclosure is provided to solve the above problems and aims to provide a method and device for effectively controlling congestion in a mobile communication system.

Specifically, the present disclosure aims to provide a method and device for acquiring, by a CN node of a mobile communication system, an identifier of a UE located in a cell in which congestion occurs and providing the same to another CN node.

Additionally, the present disclosure aims to provide a method and device for reducing service delay which occurs due to the process of exchange of authentication or security information that is necessary when a UE being provided with a specific service switches to another service.

Technical Solution

In accordance with an aspect of the present disclosure, a method for controlling congestion by a core network node in a mobile communication system is provided. The method may include receiving congestion-related information from at least one base station; transmitting, to a mobility management entity, a terminal information request message for requesting information about a terminal corresponding to the base station, based on the congestion-related information; receiving a terminal information response message containing the information about the terminal corresponding to the base station from the mobility management entity; and transmitting the information about the terminal corresponding to the base station to another core network node.

In accordance with another aspect of the present disclosure, a method for controlling congestion by a mobility management entity in a mobile communication system is provided. The method may include: receiving, from the core network node, a terminal information request message for information corresponding to at least one base station experiencing congestion; checking information about a terminal corresponding to the base station; and transmitting, to the core network, a terminal information response message containing the information about the terminal.

In accordance with another aspect of the present disclosure, a core network node for controlling congestion in a mobile communication system is provided. The core network node may include: a transceiver to transmit and receive a signal; and a control unit to control to receive congestion-related information from at least one base station, transmit, to a mobility management entity, a terminal information request message for requesting information about a terminal corresponding to the base station, based on the congestion-related information, receive a terminal information response message containing the information about the terminal corresponding to the base station from the mobility management entity, and transmit the information about the terminal corresponding to the base station to another core network node.

In accordance with another aspect of the present disclosure, a mobility management entity for controlling congestion in a mobile communication system is provided. The mobility management entity may include: a transceiver to transmit and receive a signal; and a control unit to control to receive, from the core network node, a terminal information request message for information corresponding to at least one base station experiencing congestion, check information about a terminal corresponding to the base station and transmit, to the core network, a terminal information response message containing the information about the terminal.

In accordance with another aspect of the present disclosure, a method for supporting a security procedure for a terminal by a core network node in a mobile communication system is provided. The method may include generating CS security key-related information for the terminal to use in a circuit-switched fallback (CSFB) procedure, and transmitting the generated CS security key-related information to a control node of a CS domain.

In accordance with another aspect of the present disclosure, a core network node for supporting a security procedure for a terminal in a mobile communication system. The core network node may include a transceiver to transmit and receive a signal to and from the terminal or any nodes of the mobile communication system, and a control unit to control to generate CS security key-related information for the terminal to use in a circuit-switched fallback (CSFB) procedure and transmit the generated CS security key-related information to a control node of a CS domain.

In accordance with another aspect of the present disclosure, a method for performing a circuit-switched fallback (CSFB) procedure by a terminal in a mobile communication system is provided. The method may include sensing triggering of the CSFB, checking CS security key-related information and performing a call setup process for a circuit switched domain based on the CS security key-related information.

In accordance with another aspect of the present disclosure, a terminal configured to perform a circuit-switched fallback (CSFB) procedure in a mobile communication system is provided. The terminal may include a transceiver to transmit and receive a signal to and from a base station, and a control unit to control to sense triggering of the CSFB, check CS security key-related information and perform a call setup process for a circuit switched domain based on the CS security key-related information.

Advantageous Effects of Disclosure

According to an embodiment of the present disclosure, information about a cell or base station and UEs belonging thereto may be signaled to a core network, and accordingly, congestion may be effectively controlled for respective cells or base stations.

According to an embodiment of the present disclosure, CS security key information which a UE can use after switching to a legacy network may be pre-delivered to a CS CN node and stored by the CS CN node, and accordingly when CSFB occurs for the UE, the UE is allowed to use the stored CS security key information. Therefore, separate authentication or security-related signaling is unnecessary, and thus a call connection time may be reduced.

DETAILED DESCRIPTION

Figure 1:
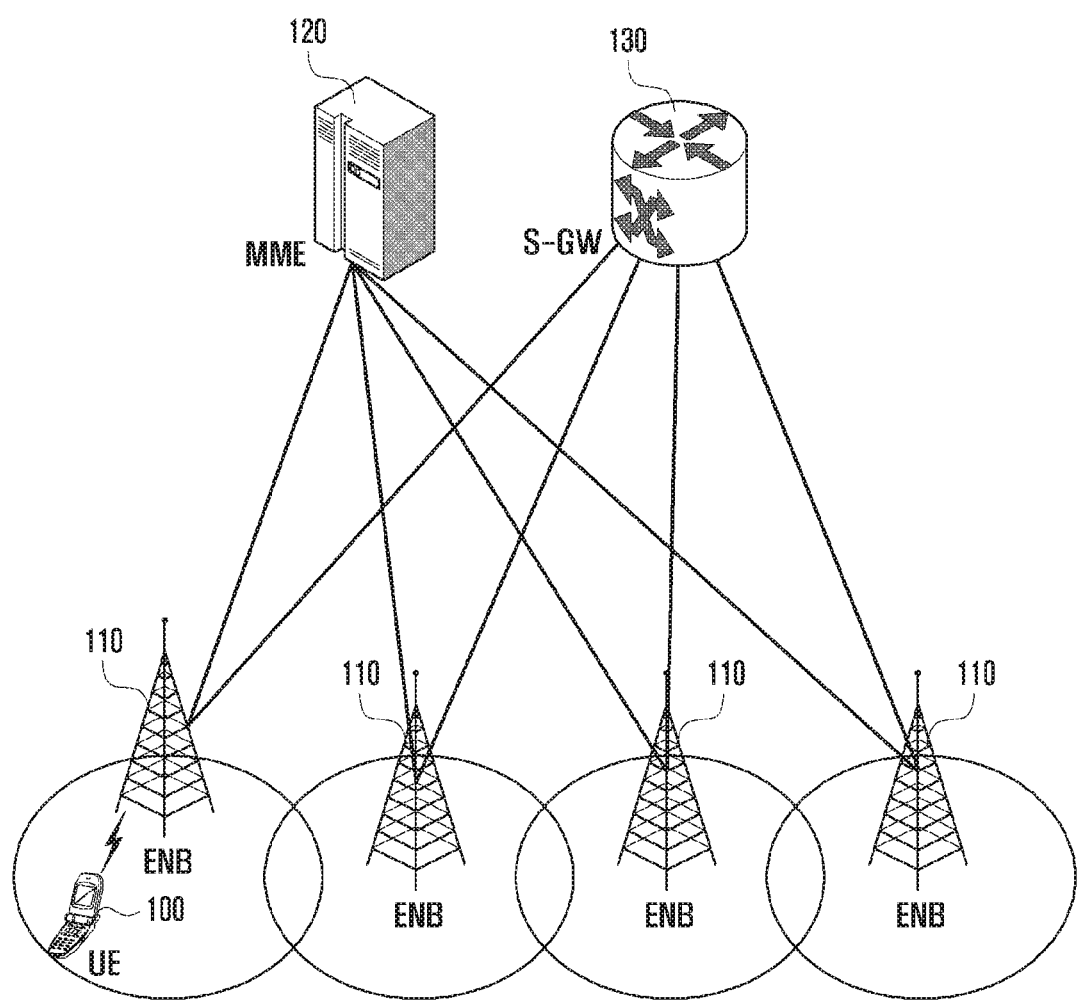
FIG. 1 is a view illustrating the structure of a typical LTE mobile communication system.

Hereinafter, exemplary embodiments of the present disclosure will be described in more detail with reference to the accompanying drawings. Wherever possible, the same reference numbers will be used throughout the drawings to refer to the same or like elements. A detailed description of well-known functions and configurations incorporated herein may be omitted in order to avoid obscuring the subject matter of the present disclosure.

In describing embodiments of the present disclosure in detail, a description will be mainly given of an OFDM-based wireless communication system, particularly 3GPP EUTRA standard by way of example, but the present disclosure is also applicable to other communication systems having a technical background or channel type similar to that of the present disclosure within the scope of the present disclosure by applying a slight modification to the present disclosure, which can be implemented by those skilled in the art.

The detailed description of embodiments of the present disclosure given below mainly focuses on a circuit switched fallback (CSFB) process in which the UE switches from LTE to a CS network to secure a voice service. The present disclosure mainly aims to simplify an authentication/security information process which is needed when a UE switches from one system to another to secure a specific service. The present disclosure is also applicable to other communication systems services having a technical background or channel type similar to that of the present disclosure within the scope of the present disclosure by applying a slight modification to the present disclosure, which can be implemented by those skilled in the art.

In the specification and the drawings, the term LTE network adopted herein may have the same meaning as E-UTRAN, and a CS network may be a UTRAN, GERAN, CDMA2000, or a network similar thereto which is capable of supporting CS services. The UTRAN, GERAN, CDMA2000, and the network similar thereto may be collectively referred to as a legacy network. In the specification and the drawings, presence in one network encompasses both a case of being connected to one network and a case of camping in one network while staying in an idle state. In addition the term base station corresponds to an eNB for E-UTRAN. In the specification and the drawings, the CS security key may represent a whole CS security context in a broad sense, and may be information including at least one of CK' (or CK), IK' (or IK), Key Set Identifier (KSI), an integrity protection algorithm, a start value and a ciphering algorithm. In other words, according to an embodiment of the present disclosure, the CS security key may be referred to as CS security key-related information, mean a CS security key itself, or include at least one parameter needed to generate a CS security key. In addition, the security related information includes the entirety or a part of a downlink NAS count value for a UE.

In the embodiments and drawings of the present disclosure, an HSS may be an entity identical to or physically concatenated with an HRL.

When an incoming or outgoing voice call occurs while a UE is present in the E-UTRAN, a CSFB process may be initiated. The UE transmits a request for CSFB to an MME through an Extended Service Request message. Then, the MME receiving the message determines whether or not CSFB is possible, and if CSFB is possible, the MME delivers, to an eNB, an identifier or Cause indicating that CSFB is needed, through an Initial Context Setup Request message or a UE Context Modification Request message.

Upon receiving the identifier or cause, the eNB delivers a shift command (a handover command or RRC connection release) for CSFB to the UE.

Upon receiving the command, the UE switches to a legacy network supporting a CS service and attempts to access the legacy network.

The CSFB process described above is intended to conceptually describe operation of 3GPP TS 23.272, and detailed steps thereof may be based on the 3GPP TS 23.272.

After being connected to the legacy network, the UE needs to transmit a location registration or service request message to the legacy network. Since the UE does not have security information (e.g., a CS security key) to use in a CS network, security (integrity protection or ciphering) is not applicable to the location registration or service request message.

Since a core network (CN) node (MSC or VLR) of the legacy network receiving the request message does not have authentication information (e.g., CS security key) about the UE, the CN node may initiate a CS call setup after additionally performing a process for generating authentication information.

However, the security or authentication procedure of the CS network occurring in the CSFB process results in increase in the overall time of CSFB call setup, which may degrade the quality of services provided to the user.

To solve the problems described above, the present disclosure proposes a method for pre-delivering, to a CS CN node, CS security key-related information (CS security key) which the UE can use after switching to the legacy network, such that the CS CN node stores the CS security key-related information. That is, the present disclosure provides a method and apparatus for pre-storing CS security key-related information (a CS security key) in a location registration process between a UE and a CS CN node and using the stored CS security key-related information when CSFB occurs, thereby reducing the call setup time without separate signaling related to authentication or security.

According to an embodiment of the present disclosure, when a UE performs a combined attach or combined TAU process in an LTE network, a PS CN node generates CS security key-related information (a CS security key) in the location registration process and delivers the same to a CS CN node such that the information is stored. Thereafter, when CSFB occurs, the UE may use CS security key-related information (a CS security key) matching CS signaling in performing CS signaling to proceed with a CSFB process without a separate security or authentication procedure. Hereinafter, a detailed description will be given of the process with reference to FIG. 2.

Figure 2:
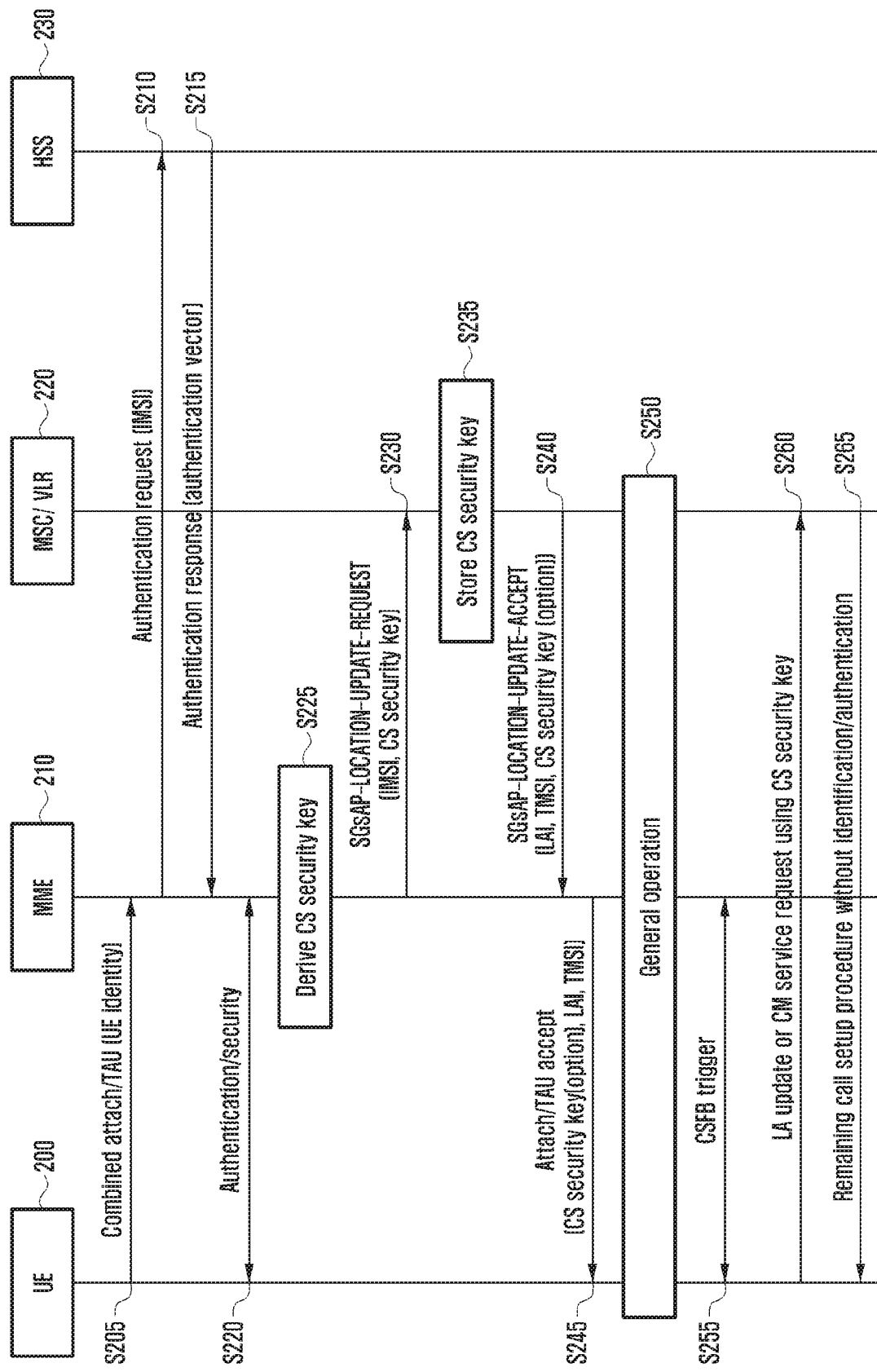
FIG. 2 is a flowchart illustrating a sequence of operations of a UE and a network in the process of registration of the UE in a PS domain according to an embodiment of the present disclosure.

FIG. 2 is a flowchart illustrating a sequence of operations of a UE and a network according to an embodiment of the present disclosure.

In step S205, a UE 200 transmits, to an MME 210, a combined attach or TAU request message containing a UE identity (e.g., International Mobile Subscriber Identity (IMSI), Globally Unique Temporary Identifier (GUTI), or S-TMSI). The combined attach message may be a message making a request for receiving, for example, a packet exchange service and a circuit exchange service at the same time.

Then, in step S210, the MME 210 delivers, to an HSS 230, a message requesting subscription information and authentication information, using the ID of the UE 200. Then, in step S215, the HSS 230 delivers the subscription information and authentication information (parameter and key sets related to authentication and security; hereinafter, an authentication vector) about the UE to the MME 210 in response.

Then, in step S220, the MME 210 may perform the remaining authentication/security related process together with the UE using the subscription information and authentication vector information.

According to an embodiment of the present disclosure, in step S225 in the remaining combined attach or TAU process, the MME 210 generates CS security key-related information (a CS security key). In this case, the MME 210 may generate the CS security key-related information using the authentication vector received from the HSS 230 or a security context for a PS domain, for example, a Kasme key among MM contexts which the MME 210 and the UE have determined to use. Herein, the CS security key-related information (CS security key) may include at least one of CK' (CK for CSFB), IK' (IK for CSFB), a Key Set Identifier (KSI), an integrity protection algorithm, a start value and a ciphering algorithm.

The CS security key-related information also includes the entirety or a part of a downlink NAS count value for the UE. More specifically, the MME and the UE generate the CS security key using the stored Kasme key and parameters, and the selected NAS count value.

If CSFB or SMS over SGs is applicable for the UE 200, the MME 210 performs a location update process together with an MSC/VLR 220 in step S230. The MME 210 may deliver, to the MSC/VLR 220, an SGsAP-LOCATION-UPDATE-REQUEST message containing the CS security key-related information (CS security key).

Upon receiving the message, the MSC/VLR 220 performs location registration, and then in S240, delivers an SGsAP-LOCATION-UPDATE-ACCEPT message to the MME 210. In this case, if some or all of the CS security key-related information (CS security key) delivered by the MME 210 is changed, the CS security key-related information (CS security key) changed or generated by the MSC/VLR 220 may be included in the message. In the case where some or all of the CS security key-related information (CS security key) is changed, the CS security key-related information may contain parameters needed to generate a CS security key as described above, and the MME 210 MSC 220 may change and use some of the delivered parameters even when a specific parameter is delivered to the MSC 220. In this case, the MSC 220 needs to signal the changed CS security key-related information (CS security key) back to the MME 210.

Meanwhile, in step S235, the MSC/VLR 220 may store CS security key-related information (CS security key) received from the MME 210 or updated from the received information as a part of the context for the UE 200.

Thereafter, if the attach request for the UE 200 is accepted, the MME 210 may deliver, to the UE, an Attach or TAU accept message including all or some of the information received from MSC/VLR 220 in step S245. Particularly, in this case, if the MSC/VLR 220 changes or generates CS security key-related information (a CS security key) and delivers the same to the MME 210, the MME 210 may deliver all or some of relevant information to the UE. If a downlink NAS count value is used in generating a CS security key, and the CS security key needs to be generated directly by the UE, the MME sends the UE information containing the entirety or a part of the downlink NAS count value.

Thereafter, the UE 200 may perform sense occurrence of the CSFB process in step S255 while performing normal operation in S250. Then, in step S260, the UE 200 may switch to a legacy network and then generate and deliver a Location Area (LA) update request or CM service request message. Prior to this process, if the message previously received from the MME 210 contains CS security key-related information (a CS security key), the UE 200 may use the contained information. Additionally, if the received message does not contain the CS security key-related information (CS security key), the UE 200 may generate CS security key-related information (a CS security key). Thereby, the UE 200 may apply integrity protection to the aforementioned request messages or may include all or some of the CS security key-related information (CS security key)

used by the UE, for example, a KSI in the messages. When the UE generates a CS security key from a PS security context, the UE uses the received information, the downlink NAS count information, and the stored EPS context (i.e., the Kaseme key).

According to the embodiment described above, the UE 200 and the CS CN node use the CS security key-related information (CS security key) synchronized therebetween, and therefore the remaining CS call setup process may be performed without a separate authentication or security procedure.

According to another embodiment of the present disclosure, the CS security key-related information (CS security key) about the UE may be delivered between CN nodes not in the attach/TAU process but when CSFB actually occurs.

Specifically, if an MME delivers CS security key-related information (a CS security key) to an MSC/VLR while operations are being performed among a UE, the MME, an eNB, and eNBs of the legacy network, the CS CN node may retain the CS security key-related information (CS security key) before the UE switches to the legacy network to deliver a message. That is, if a process of the MME delivering the CS security key-related information (CS security key) to the MSC/VLR is performed in parallel with conventional operation of CSFB according to 3GPP TS 23.272, the security/authentication process needed between the UE and the CS CN node may be simplified. Hereinafter, this process will be described in detail with reference to FIGS. 3 and 4.

Figure 3:
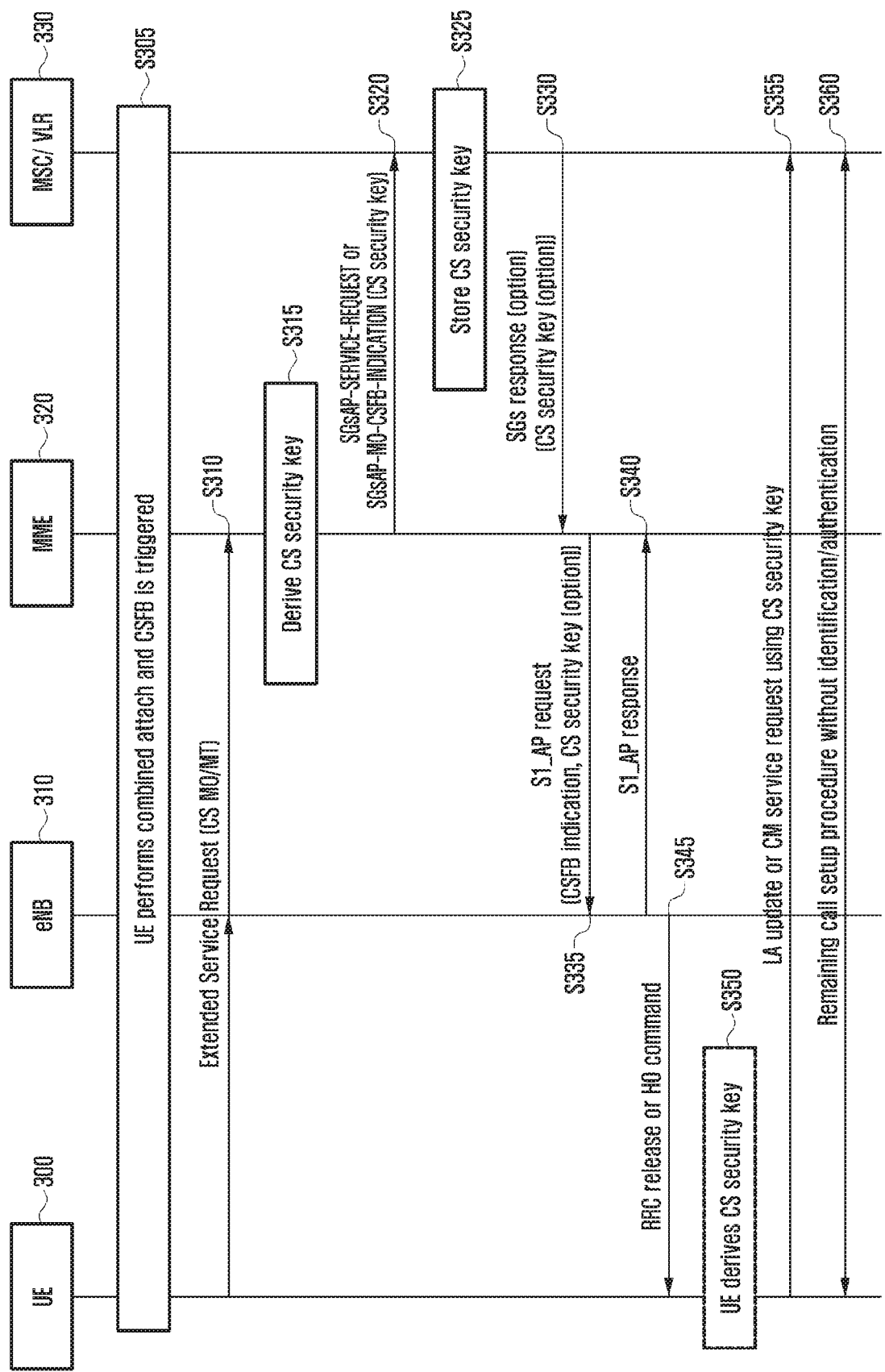
FIG. 3 is a flowchart illustrating a sequence of operations of a UE and a network performed when CSFB is triggered for the UE according to another embodiment of the present disclosure.

FIG. 3 is a flowchart illustrating a sequence of operations of a UE and a network.

Suppose that a UE 300 is attached to (combined with) an LTE network according to 3GPP TS 23.401, 23.272, and CSFB is available to the UE 300 in step S305.

In step S310, the UE 300 senses occurrence of outgoing or incoming CSFB. Then, the UE 300 delivers an Extended Service Request message to an MME 320 in step S310 to request CSFB.

Then, in step S315, if CSFB is possible, the MME 320 generates CS security key-related information (a CS security key). In this case, the MME 320 may generate the information using a stored authentication vector or a security context for a PS domain, for example, a Kasme key among MM contexts which the MME 320 and the UE 300 have determined to use. Herein, the CS security key-related information (CS security key) may include at least one of CK', IK', a Key Set Identifier (KSI), an integrity protection algorithm, a start value and a ciphering algorithm.

The CS security key-related information also includes the entirety or a part of a downlink NAS count value for the UE. More specifically, the MME and the UE generate the CS security key using the stored Kasme key and parameters, and the selected NAS count value.

In step S320, the MME 320 may transmit the generated CS security key-related information (CS security key) to the MSC/VLR 330 through an SGsAP-SERVICE-REQUEST (in the case of an incoming call) or SGsAP-MO-CSFB-INDICATION (in the case of an outgoing call) message sent to the MSC/VLR 330.

Then, in step S325, the MSC/VLR 330 may store the CS security key-related information (CS security key) received from the MME 320 as a part of a context for the UE 340 or may update the CS security key-related information (CS security key) based on the information received from the MME 320 when necessary and store the updated information. If the CS security key-related information (CS security key) is updated, the MSC/VLR 330 may deliver the updated information to the MME 320 through a separate SGsAP message in step S330. Since a description has been given above of the case of updating the CS security key-related information (CS security key), a detailed description thereof will be omitted.

In step S335, the MME 320 may deliver a request for execution of CSFB to an eNB 310 by transmitting an identifier or Cause indicating occurrence of CSFB through an Initial Context Setup Request message (in the idle mode) or a UE Context Modification Request message (in the connected mode). In this case, the messages may optionally contain CS security key-related information (a CS security key) for the UE to use. The CS security key-related information includes the entirety or a part of a downlink NAS count value for the UE. That is, if a downlink NAS count value is used in generating a CS security key and the CS security key needs to be generated directly by the UE, the MME inserts the entirety or a part of a downlink NAS count value in the information sent to the eNB.

Then, in step S340, the eNB 310 transmits a response.

Then, in step S345, the eNB 310 delivers, to the UE 300, a command (an RRC connection release or handover command) message to move the UE 300 to a legacy network over which a CS service can be provided. If the MME 320 delivers CS security key-related information (a CS security key) to the eNB 310 in the aforementioned process, the eNB 310 may optionally transmit the received CS security key-related information (CS security key) to the UE 300 through the message. In addition, the CS security key-related information contains the entirety or a part of a downlink NAS count value for the UE.

According to an embodiment of the present disclosure, the sequential order of the process of the MME 320 sending a request for execution of CSFB to the eNB 310 and receiving a response and the process of delivering the CS security key-related information (CS security key) to the MSC/VLR 330 is not important. These processes may be performed in parallel, which will be described in detail with reference to FIG. 4.

Thereafter, in step S355, the UE 345 may switch to the legacy network according to the command of the eNB 310 and then generate and deliver a Location Area (LA) update request or CM service request message.

Prior to this process, if the message previously received from the eNB 310 contains CS security key-related information (a CS security key), the UE 300 may use the contained information in step S350. In addition, if the received message does not contain the CS security key-related information (CS security key), the UE 300 may generate CS security key-related information (a CS security key). Thereby, the UE 300 may apply integrity protection to the aforementioned request messages using the CS security key-related information (CS security key), or may insert all or some of the CS security key-related information (CS security key) used by the UE, for example, a KSI in the messages. When the UE generates a CS security key from a PS security context, the UE uses the received information, the downlink NAS count information, and the stored EPS context (i.e., the Kaseme key).

According to the embodiment described above, the UE and the CS CN node use the CS security key-related information (CS security key) synchronized therebetween, and therefore the remaining CS call setup process may be performed without a separate authentication or security procedure.

According to another embodiment of the present disclosure, the CS security key-related information (CS security key) about the UE may be delivered between CN nodes not in the attach/TAU process but when CSFB actually occurs. That is, if an MME delivers CS security key-related information (a CS security key) to an MSC/VLR while operations are being performed among a UE, the MME, an eNB, and eNBs of the legacy network, the CS CN node may retain the CS security key-related information (CS security key) before the UE switches to the legacy network to deliver a message. That is, if a process of the MME delivering the CS security key-related information (CS security key) to the MSC/VLR is performed in parallel with conventional operation of CSFB according to 3GPP TS 23.272, the security/authentication process needed between the UE and the CS CN node may be simplified.

Figure 4:
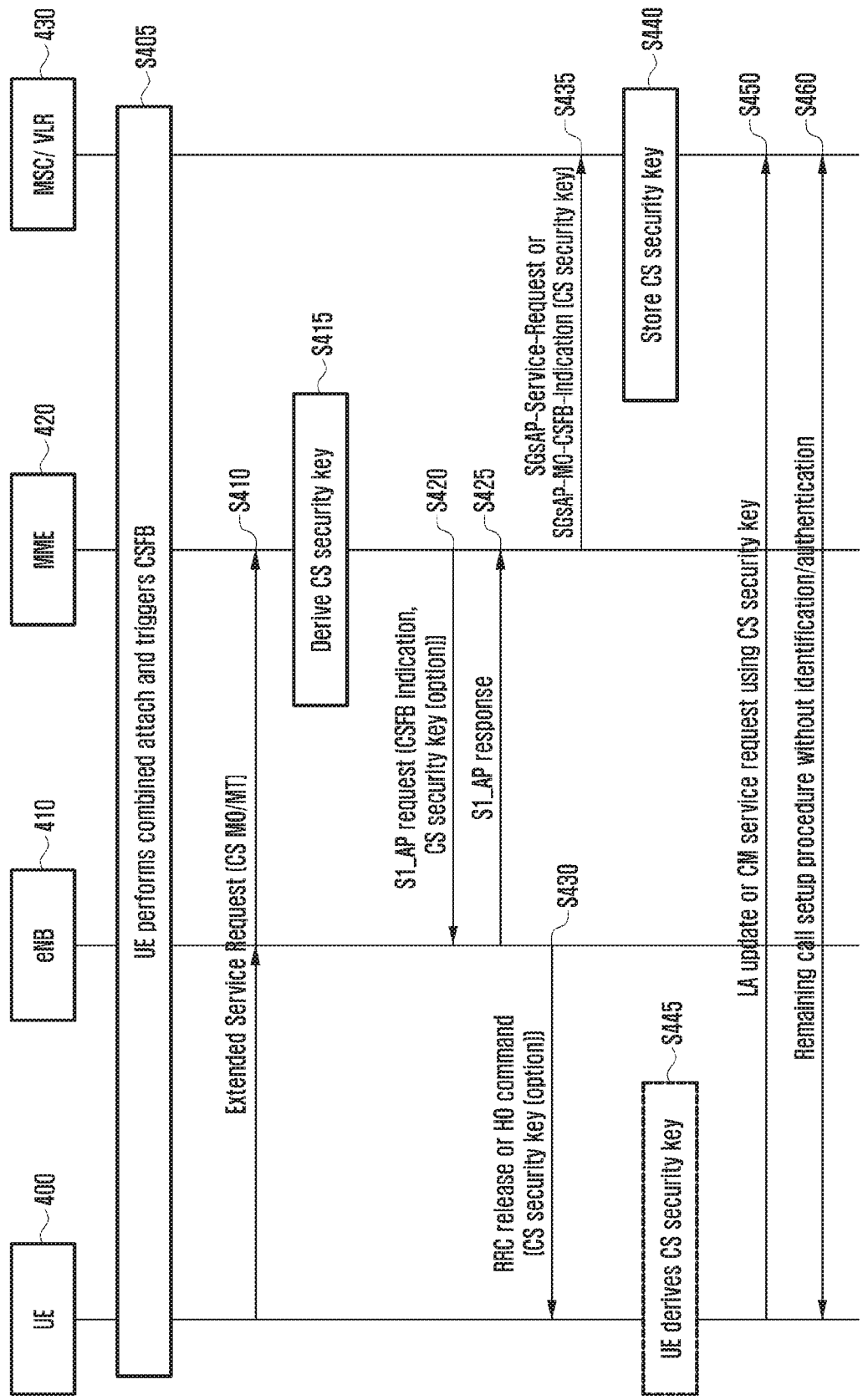
FIG. 4 is a flowchart illustrating a sequence of operations of a UE and a network performed when CSFB is triggered for the UE according to another embodiment of the present disclosure.

FIG. 4 is a flowchart illustrating a sequence of operations of a UE and a network according to another embodiment of the present disclosure.

Suppose that a UE 400 is attached to (combined with) an LTE network according to 3GPP TS 23.401, 23.272, and CSFB is available to the UE 400 in step S405. In addition, suppose that outgoing or incoming CSFB has occurred to the UE 400.

In this case, in step S410, the UE 400 delivers an Extended Service Request message to an MME 420 to request CSFB. Then, in step S415, if CSFB is possible, the MME 420 generates CS security key-related information (a CS security key). In this case, the MME 420 may generate the information using a stored authentication vector or a security context for a PS domain, for example, a Kasme key among MM contexts which the MME 420 and the UE 400 have determined to use. Herein, the CS security key-related information (CS security key) may include at least one of CK', IK', a Key Set Identifier (KSI), an integrity protection algorithm, a start value and a ciphering algorithm. The CS security key-related information also includes the entirety or a part of a downlink NAS count value for the UE. That is, if a downlink NAS count value is used in generating a CS security key and the CS security key needs to be generated directly by the UE, the MME inserts the entirety or a part of a downlink NAS count value in information sent to the eNB.

Thereafter, in step S420, the MME 420 may deliver a request for execution of CSFB to an eNB 410 by transmitting an identifier or cause indicating occurrence of CSFB through an Initial Context Setup Request message (in the idle mode) or a UE Context Modification Request message (in the connected mode). In this case, the messages may optionally contain CS security key-related information (a CS security key) for the UE 400 to use. The CS security key-related information includes the entirety or a part of a downlink NAS count value for the UE.

Then, in step S425, the eNB 410 transmits a response to the MME 420. Then, in step S430, the eNB 410 delivers, to the UE 400, a message of a command (an RRC connection release or handover command) to move the UE 400 to a legacy network over which a CS service can be provided.

If the MME 420 delivers CS security key-related information (a CS security key) to the eNB 410 in the aforementioned process, the eNB 410 may optionally transmit the received CS security key-related information (CS security key) to the UE 400 through the message. In addition, the CS security key-related information contains the entirety or a part of a downlink NAS count value for the UE.

Subsequently, in step S435, the MME 420 may deliver the generated CS security key-related information (CS security key) to the MSC/VLR 430 through SGsAP-Service-Request (in the case of an incoming call) or SGsAP-MO-CSFB-Indication (in the case of an outgoing call).

Then, in step S440, the MSC/VLR 430 may store the received CS security key-related information (CS security key). Thereafter, the MSC/VLR 430 may use the stored information when CS security is needed for the UE 400.

In step S450, the UE 400 may switch to the legacy network according to the command of the eNB 410, and then generate a Location Area (LA) update request or CM service request message and deliver the same to the MSC/VLR 430.

If the message previously received from the eNB 410 contains CS security key-related information (a CS security key) before step S450 is performed, the UE 400 may use the contained information. Additionally, if the received message does not contain the CS security key-related information (CS security key), the UE 400 may generate CS security key-related information (a CS security key). Then, the UE 400 may apply integrity protection to the aforementioned request messages using the generated CS security key-related information, or may insert all or some of the CS security key-related information (CS security key) used by the UE, for example, a KSI in the messages. When the UE generates a CS security key from a PS security context, the UE uses the received information, the downlink NAS count information, and the stored EPS context (i.e., the Kaseme key).

According to the embodiment described above, the UE 400 and the CS CN node use the CS security key-related information (CS security key) synchronized therebetween, and therefore the remaining CS call setup process may be performed without a separate authentication or security procedure.

Meanwhile, the UE may move during the CSFB process and thus need to set up a call through an MSC/VLR (hereinafter, referred to as MSC2) different from an MSC/VLR (hereinafter, referred to as MSC 1) in which the UE has previously been registered. According to another embodiment, if CS security key-related information (a CS security key) about the UE is configured in MSC1, when the MSC is changed to another one during the CSFB process, MSC1 may deliver the CS security key-related information (CS security key) to MSC2 such that a separate security/authentication information exchange process does not occur between the UE and MSC2. The aforementioned situation will be described with reference to FIG. 5.

Figure 5:
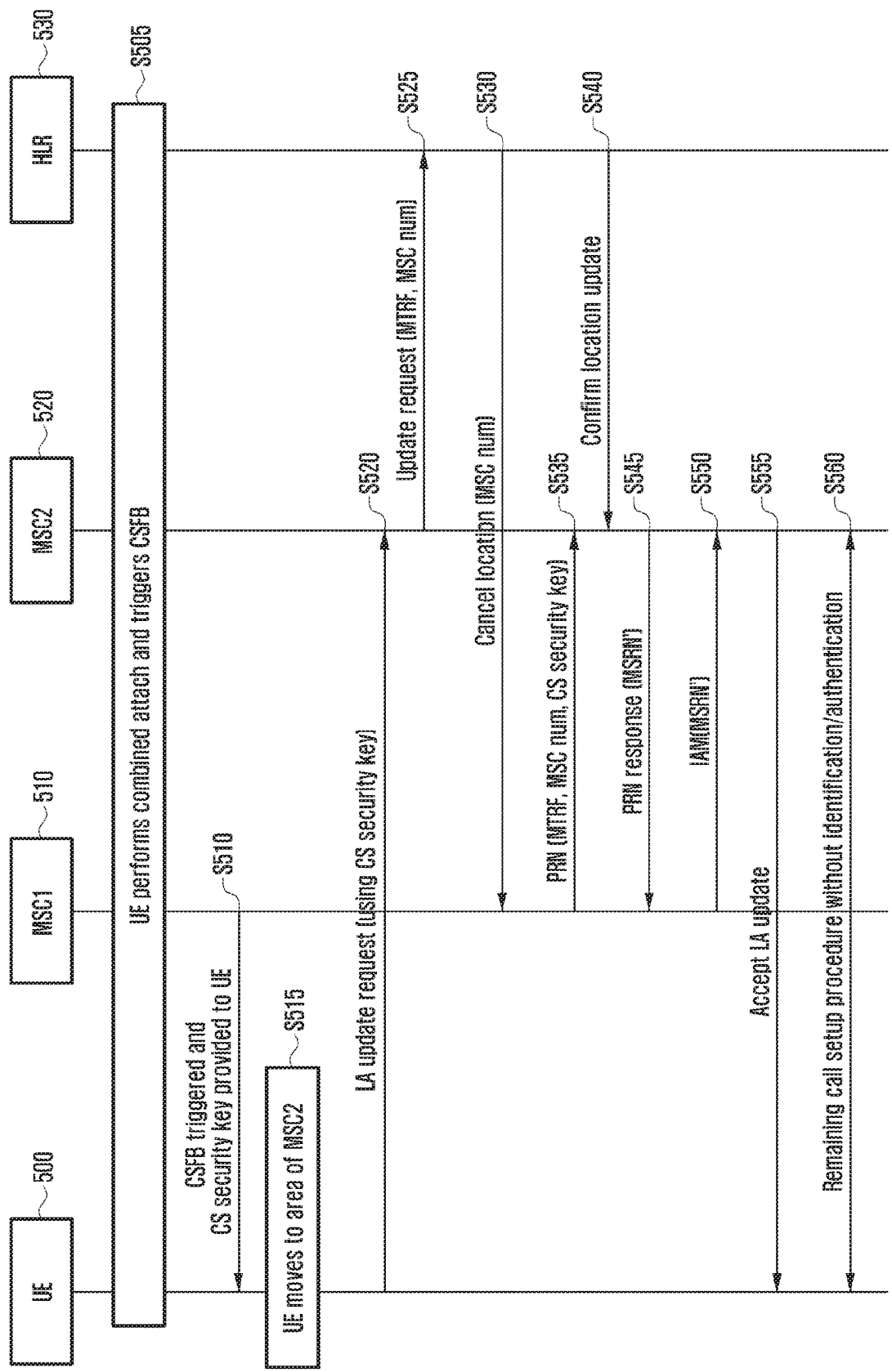
FIG. 5 is a flowchart illustrating a process of delivering CS security key information performed when an MCS managing a UE is changed, according to the present disclosure.

FIG. 5 is a flowchart illustrating a sequence of operations between CN nodes.

First, suppose that a combined attach process has been performed in connection with MSC1 510 in step S505 and thus CSFB has occurred for the UE 500 which can use the CSFB. Additionally, suppose that MSC1 510 has delivered CS security key-related information to a UE 500 in step S510.

Suppose that call setup is needed in an area managed by MSC2 520 due to movement of the UE 500 during the CSFB process as in step S515.

In this case, since the area managed by the MSC has changed, the UE 500 transmits an LA update request message to MSC2 520 in step S520. In this case, if the UE 500 has CS security key-related information (a CS security key) according to the previous embodiment of the present disclosure, the UE 500 may inset a part of the CS security key-related information (CS security key), for example, a KSI in the LA update request message and transmit the message or may apply integrity protection to the LA update request message based on the CS security key-related information (CS security key).

Upon receiving the message, MSC2 520 makes a request for location update to an HLR 530 in step S525 since the UE is not registered therein. In this case, the location update request message may contain the number of the original MSC for the UE 500, or MSC1 in this embodiment.

Then, the HLR 530 transmits a request for canceling the location to MSC1 510 in step S530 using the MSC number. Herein, the message may contain the number of a new MSC for UE 500, or MSC2 in this embodiment.

Upon receiving the message, MSC1 510 inserts the CS security key-related information (CS security key) stored therein in a PRN message and transmits the PRN message to MSC2 520 in step S535 to allow a call to be performed. Thereafter, MSC2 520 and MSC1 510 exchange a PRN response and an IAM message in steps S545 and S550, respectively.

Once MSC2 520 collects all information related to the UE 500, MSC1 510 finishes the LA update process together with the UE 500 using the received CS security key-related information (CS security key) in step S555. Then, in step S560, MSC2 520 proceeds with the remaining CSFB process.

Hereinafter, a detailed description will be given of a method for delivering CS security information (a parameter used by an MME in generating a CS security key or security key, e.g., downlink NAS count) to a UE when CSFB occurs.

The downlink NAS count is delivered to the UE to meet the following need. The UE stores an uplink NAS count value, and the MME stores a downlink NAS count value. The UE and the MME need to estimate the count value of the counterpart. If a CS key is to be generated from an EPS security context in order to reduce the time taken for the CSFB, a method of ensuring that the UE and the MME generate the same key is needed. If the downlink NAS count is used in generating the CS key, the whole downlink NAS count value or information (e.g., some bits of the downlink NAS count) allowing accurate estimation of the downlink NAS count needs to be delivered to the UE in order to increase accuracy of the downlink NAS count that the UE estimates.

The first method is to cause an MME to deliver CS security information to an eNB and cause the eNB to receive the information and deliver the same to a UE. That is, an MME receiving Extended Service Request for CSFB from a UE delivers CS security information (a generated CS key or parameters for the UE to use in generating a CS key to use when performing CSFB, including downlink NAS count) to an eNB through S1 message (Initial UE context setup or UE context modification request) that the MME send to the eNB. The eNB transmits the received CS security information to the UE through an RRC message that the eNB sends to the UE. If CSFB and PSHO Packet Switched Handover are performed at the same time, the eNB inserts the CS security information (the generated CS key or parameters for the UE to use in generating a CS key to be used when performing CSFB, including downlink NAS count) in an HO command RRC message (MobilityFromEUTRA Command) that the eNB sends to the UE. If CSFB is performed without PSHO, the eNB inserts the CS security information in an RRC message such as an RRC connection release message or an RRC connection reconfiguration message that the eNB sends to the UE. If the RRC message that the UE receives from the eNB contains the CS security information, the UE proceeds with the CSFB process using the CS security information received from the eNB. If a CS key is contained in the message, the UE uses the received CS key. If the message contains a parameter for generation of a CS key, for example, the entirety or a part of a downlink NAS count value in place of the CS key, the UE generates a CS key using the parameter and proceeds with the CSFB process using the generated CS key. If the received message contains only a part of the downlink NAS count, the UE estimates the whole downlink NAS count value from the received value and then proceeds with the remaining process.

The second method is to cause the MME to deliver CS security information directly to the UE through a NAS message. That is, an MME receiving Extended Service Request for CSFB from the UE generates a NAS message containing CS security information (a generated CS key or parameters for the UE to use in generating a CS key to use when performing CSFB, including downlink NAS count) and delivers the same to an eNB using an S1 message (Initial UE context setup, UE context release, or UE context modification request) that the MME sends to the eNB. To transmit the NAS message containing the CS security information to the UE, the MME may perform a downlink NAS transport process together with the eNB before a process of association with the eNB for the general process of CSFB. The eNB inserts the received NAS message in an RRC message to be transmitted. If the NAS message is contained in an RRC message that the UE receives from the eNB, the UE extracts CS security information from the NAS message, and proceeds with the CSFB process using the CS security information. If a CS key is contained in the message, the UE uses the received CS key. If the message contains a parameter for generation of a CS key, for example, the entirety or a part of a downlink NAS count value in place of the CS key, the UE generates a CS key using the parameter and proceeds with the CSFB process using the generated CS key. If the received message contains only a part of the downlink NAS count, the UE estimates the whole downlink NAS count value from the received value and then proceeds with the remaining process.

Meanwhile, since the LTE network cannot support the CS service by itself, technology such as CSFB employing a CS network of 2G/3G may be used when a specific service is needed, as described above.

CSFB uses an interface called SGs to allow exchange of information between an MME and an MSC, but it is difficult to add the SGs interface to some MSCs of an operator network. In this case, a method that an operator having both a LTE network and a 2G/3G network can use to support a specific service such as a voice service that is difficult to directly provide in the LTE network is to allow the UE to directly monitor control signals of the LTE network and 2G/3G CS network, rather than to cause the LTE network to assist in switching the UE to a CS network as in the case of CSFB.

That is, the UE is caused to periodically exchange a control signal with the 2G/3G network to perform the operation of MM Mobility Management in the CS network, while transmitting data over the LTE network. This method is referred to as simultaneous GSM and LTE (SGLTE). Particularly, SGLTE using only one radio module will be referred to as Single Radio Dual System (SRDS).

Figure 6:
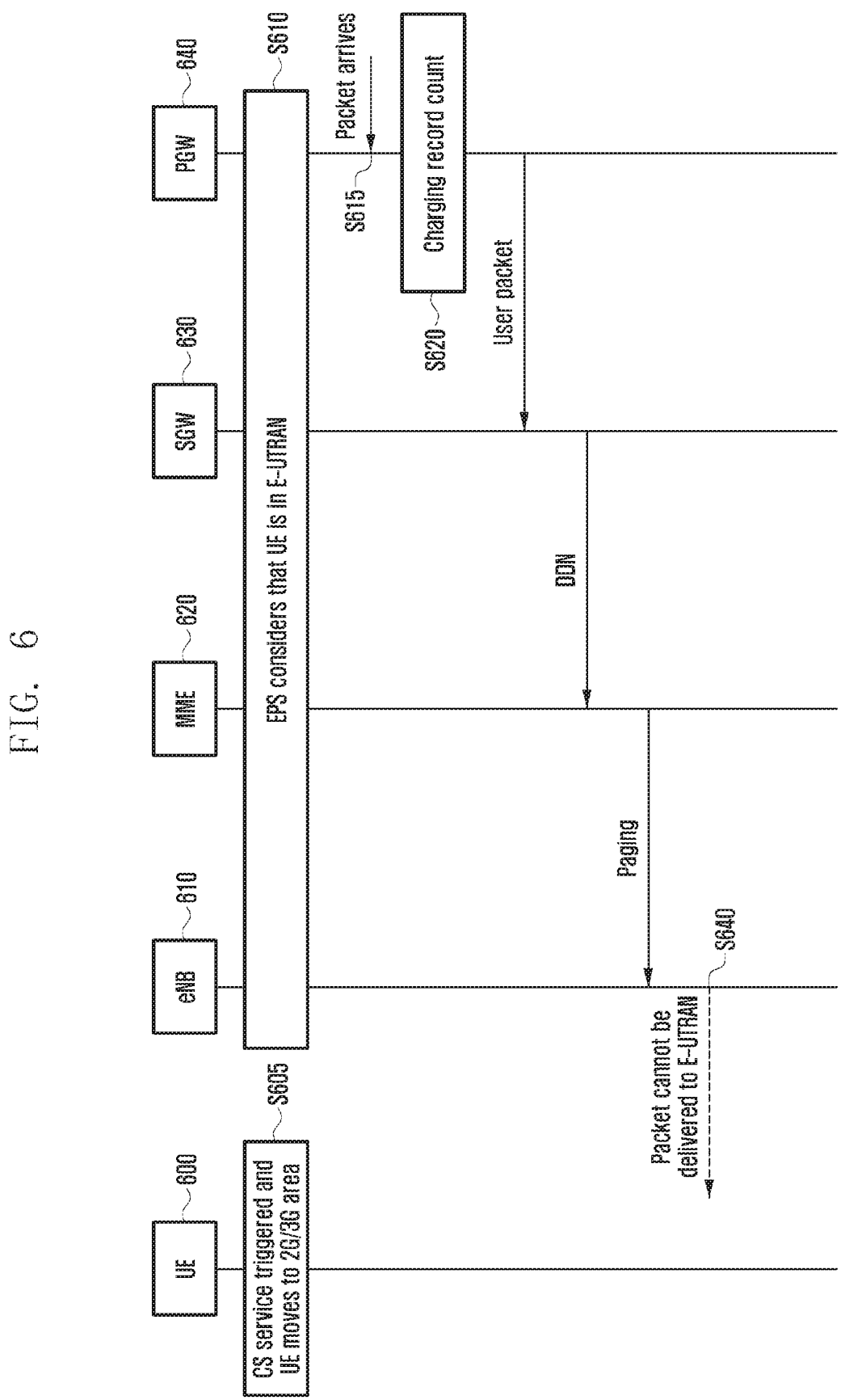
FIG. 6 is a flowchart illustrating a sequence of operations of a UE in an idle mode performed using SRDS when a CS-based service is needed for the UE, according to an embodiment of the present disclosure.

Operations of a UE in the idle mode performed in the SRDS when a CS-based service is needed for the UE are shown in FIG. 6.

FIG. 6 is a flowchart illustrating a sequence of operations of a UE in an idle mode performed using SRDS when a CS-based service is needed for the UE, according to an embodiment of the present disclosure.

When a CS-based service is needed for a UE 600, the UE 600 switches directly to the 2G/3G network to perform operations to receive the service as in step S605 without exchanging special control information with the LTE system.

In this case, the LTE system (i.e., the Evolved Packet System (EPS)) cannot explicitly recognize whether or not the UE 600 has switched to the 2G/3G network. That is, as indicated in step S610, the LTE system assumes that the UE 600 is still connected to an eNB 610 of the LTE system.

Then, in step S615, a downlink packet for the UE 600 may reach a PGW 640. Then, in step S620, the PGW 640 generates charging information, and delivers the packet to an SGW 630. Then, the SGW 630 transmits a Downlink Data Notification message to an MME 620.

Upon receiving the Downlink Data Notification message, the MME 620 makes a request to the eNB 610 for paging.

However, the UE 600 cannot receive the paging or send a response since the UE 600 has already switched to the 2G/3G network in step S605.

Accordingly, the user data packet for which the PGW 640 charges cannot be transmitted to the UE 600.

If the UE switches to the 2G/3G network to get the CS-based service while staying in the connected mode, the PGW 640 receiving a downlink packet generates charging information, and immediately delivers the same to the eNB 610 through the SGW 630. However, the eNB 610 cannot deliver the downlink packet to the UE 600, and thus can hardly avoid a situation similar to the situation described above.

The present disclosure proposes a method to solve the aforementioned problem. Specifically, a UE using the SRDS technology may inform the LTE system that the UE will switch to the 2G/3G network, immediately before the UE switches to the 2G/3G network to receive a CS-based service. Then, the LTE system receiving this information may deliver information to a GW to suspend charging the UE or additionally request that downlink packet transmission be suspended, so that incorrect charging may not occur.

Suspension of charging the UE and additional suspension of transmission of a downlink packet, which is optional, may be released when the UE transmits a TAU request or Service Request after closing the CS-based service and returning to the LTE system.

Figure 7:
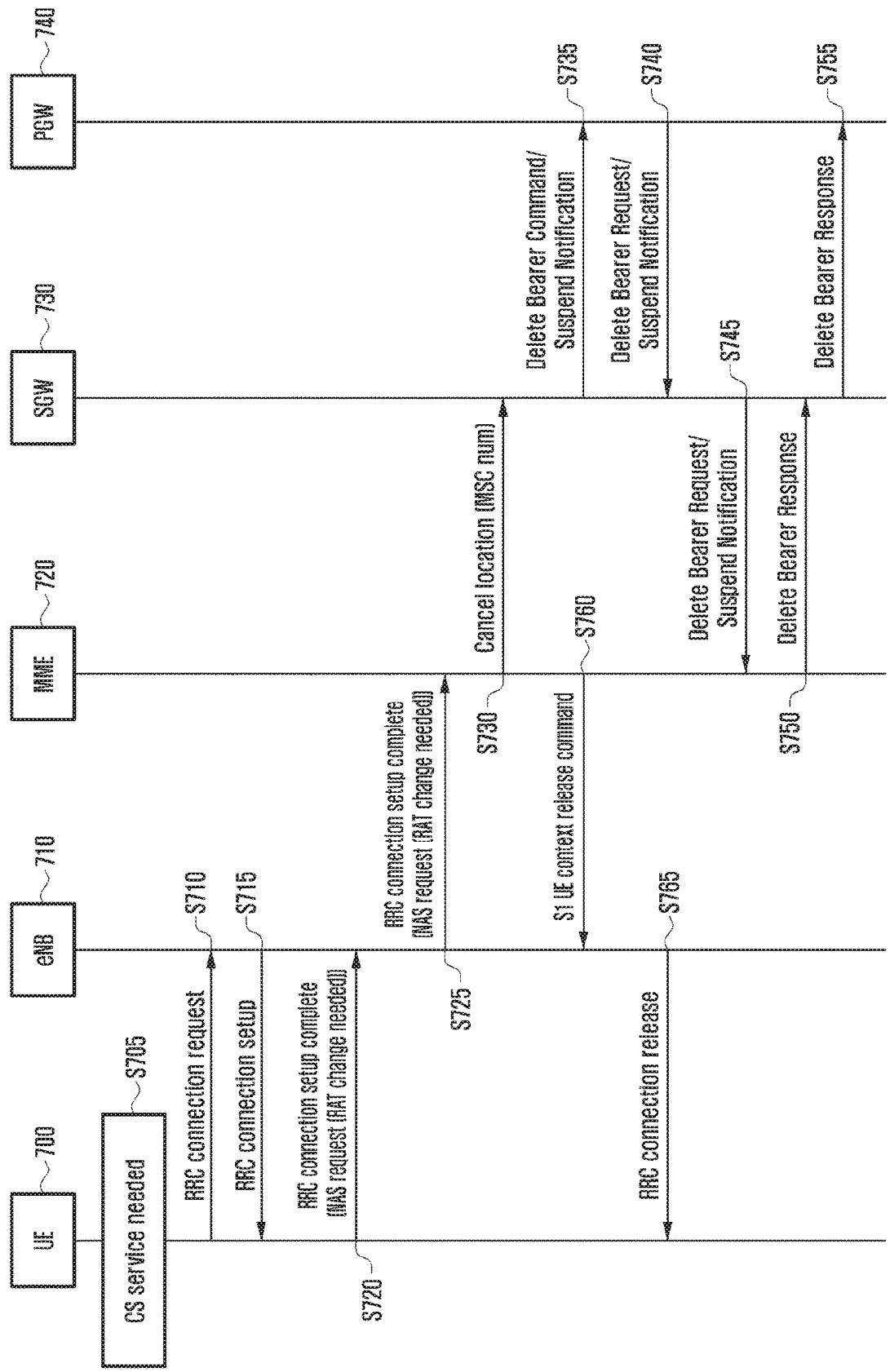
FIG. 7 is a flowchart illustrating a sequence of operations of a UE in an idle mode and an LTE system performed when a CS-based service is needed for the UE in using SRDS, according to another embodiment of the present disclosure.

FIG. 7 is a flowchart illustrating a sequence of operations of a UE and an LTE system according to another embodiment of the present disclosure.

A CS-based service may be needed for a UE 700 camping in the E-UTRAN, namely an outgoing call is needed or paging for an incoming call may be received in step S705.

In this case, in steps S720 and S725, the UE may signal, to the LTE system, that the UE will switch to a 2G/3G network soon to receive a CS-based service and cannot receive PS data through the E-UTRAN in the meantime, before the UE switches to the 2G/3G network. This signaling may be delivered to an MME 720 via an eNB 710 using a specific NAS message (e.g., EMM status). Such NAS message may contain an IE or Cause indicating the situation, namely indicating that the UE temporarily switches to the 2G/3G network to receive the CS-based service. In the present disclosure, delivering the NAS message to the MME via the eNB means that an RRC message containing the NAS message generated by the UE is delivered to the eNB through an RRC message, and the eNB receiving the same delivers the NAS message to the MME through an S1_AP message.

If the UE 700 is in the idle mode, the UE 700 needs to proceed with an RRC connection setup process in steps S710 and S715 as shown in the figure. If the UE 700 is already in the connected mode, the UE 700 may immediately transmit the NAS message using an RRC message.

Upon receiving the message, the MME 720 may recognize that the UE 700 switches to the 2G/3G network to receive the CS-based service, and charging for a PS data packet or data transmission should be temporarily suspended.

Thereby, if the MME 720 has Guaranteed Bit Rate (GBR) bearers for the UE 700, the MME 720 performs a process of deactivating/deleting the GBR bearers together with an SGW 730 and a PGW 740 in step S725 and later steps. In this case, a Delete Bearer Command message delivered to the SGW 730 by the MME 720 in step S730 and delivered to the PGW 740 by the SGW 730 in step S735 may contain an IE or Cause indicating that the UE 700 temporarily switches to the 2G/3G network to receive the CS-based service.

The MME 720 may also perform a Suspend process to suspend non-GBR bearers. To this end, a Suspend Notification message S730 delivered to the SGW 730 by the MME 720 in step S730 and delivered to the PGW 740 by the SGW 730 in step S735 may contain an IE or Cause indicating that the UE 700 temporarily switches to the 2G/3G network to receive a CS-based service.

The PGW 740 deletes the GBR bearers and suspends the non-GBR bearers through these processes.

The MME 720 may repeatedly perform these operations for respective PDN connections. In parallel with the operation with the GWs, the MME 720 may transmit, to the eNB 710, a command to release an ECM connection to the UE 700, namely an S1 UE context release command in step S760.

Upon receiving the command, the eNB 710 may deliver an RRC connection release message to the UE 700 in step S765.

Thereafter, according to the embodiment described above, the UE 700 may switch to the 2G/3G network to proceed with the CS-based service.

According to a variant of the embodiment described above, the UE may not signal, to the MME, that the UE will switch to the 2G/3G network, through the NAS message. Instead, the UE may deliver the signaling to the eNB through an RRC message (i.e., a message different from the NAS message), and the eNB may in turn deliver the same to the MME.

More specifically, the UE may announce, through an RRC message (e.g., RRC connection request or RRC connection setup complete), that the UE will switch to the 2G/3G network to proceed with the CS-based service, and then may switch to the 2G/3G network after receiving a response to the information. Once the eNB receives the information from the UE, the eNB delivers the information to the MME through an S1 AP message. Subsequent operations of the MME and the SGW/PGW are the same as those illustrated in FIG. 7.

Figure 8:
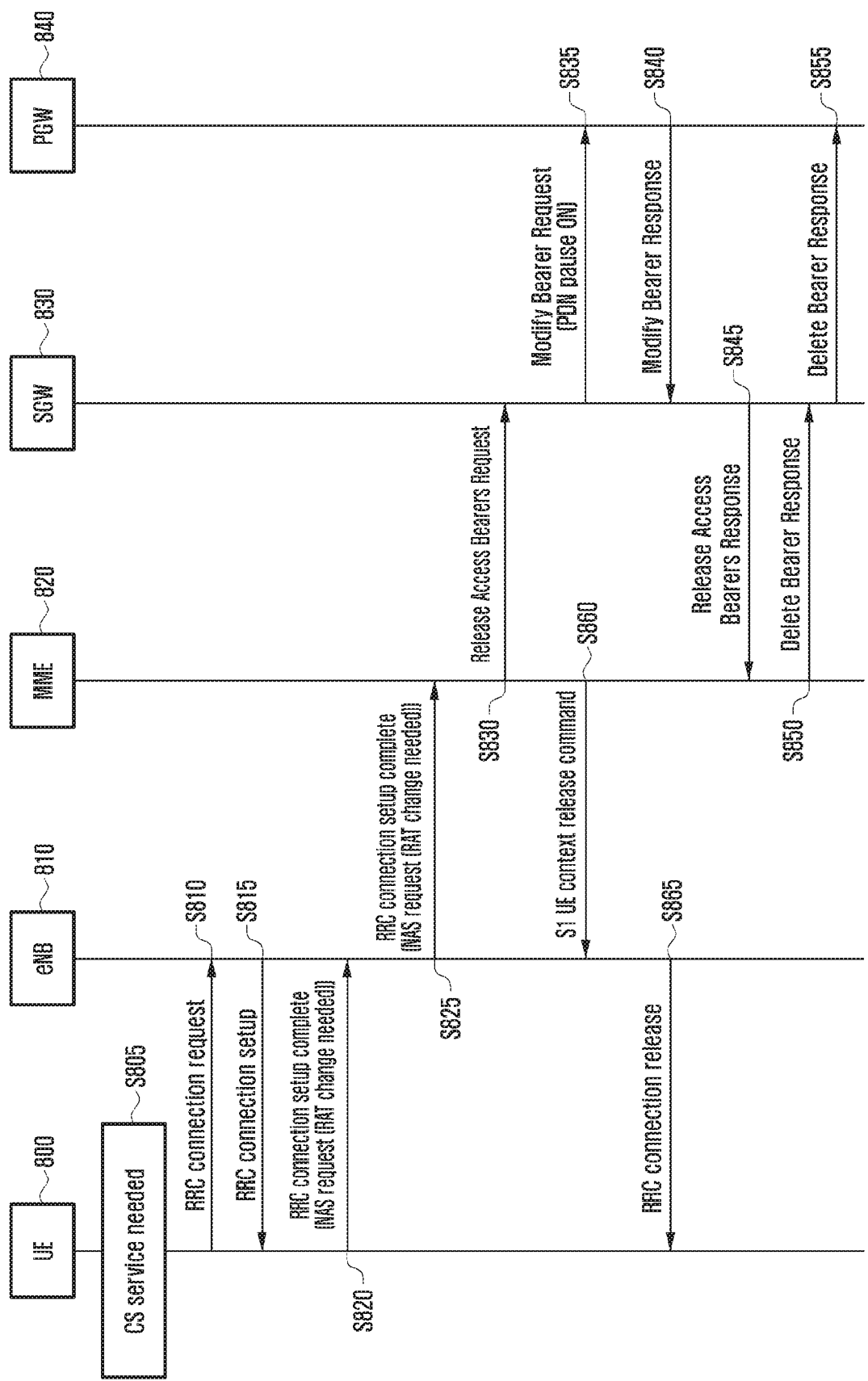
FIG. 8 is a flowchart illustrating a sequence of operations of a UE and an LTE system performed using SRDS when a CS-based service is needed for the UE in an idle mode, according to another embodiment of the present disclosure.

FIG. 8 is a flowchart illustrating a sequence of operations of a UE and an LTE system performed according to another embodiment of the present disclosure.

First, as shown in the figure, a CS-based service may be needed for a UE 800 camping in the E-UTRAN, namely an outgoing call is needed or paging for an incoming call may be received in step S805.

In this case, in step S820, the UE 800 may signal, to the LTE system, that the UE 800 will switch to a 2G/3G network soon to receive a CS-based service and cannot receive PS data through the E-UTRAN in the meantime, before the UE 800 switches to the 2G/3G network. This signaling may be delivered to an MME 820 using a specific NAS message (e.g., EMM status) as in step S825. Such NAS message may contain an IE or Cause indicating the situation, namely indicating that the UE 800 temporarily switches to the 2G/3G network to receive the CS-based service.

If the UE 800 is in the idle mode, the UE 800 needs to proceed with an RRC connection setup process in steps S810 and S815 as shown in the figure. If the UE 800 is already in the connected mode, the UE 800 may immediately transmit the NAS message using an RRC message.

Upon receiving the message, the MME 820 may recognize that the UE 800 switches to the 2G/3G network to receive the CS-based service, and charging for a PS data packet or data transmission should be temporarily suspended. Thereby, the MME 820 may deliver a Release Access Bearers Request message to an S-GW 830 in step S830 to suspend changing the UE 800. The message may contain an IE or Cause indicating that the UE 800 temporarily switches to the 2G/3G network to receive the CS-based service.

Upon receiving the message, the SGW 830 may transmit a Modify Bearer Request message to PGWs 840 having a PDN connection to the UE 800 in step S835. The message may contain a PDN pause ON flag, and additionally contain an IE or Cause indicating that the UE 800 temporarily switches to the 2G/3G network to receive a CS-based service. Then, the PGW 840 transmits a Modify Bearer Response message to the SGW 830 in step S840. Then, the SGW 830 transmits a Release Access Bearers Response message to the MME 820 in step S845, and receives a Delete Bearer response message from the MME 820 in step S850. Then the SGW 830 transmits the Delete Bearer Response message to the PGW 840.

In parallel with the operation with the GWs, the MME 820 may transmit, to the eNB 810, a command to release an ECM connection to the UE 800, namely an S1 UE context release command in step S860.

Upon receiving the command, the eNB 810 may deliver an RRC connection release message to the UE 800 in step S865. Thereafter, the UE 800 may switch to the 2G/3G network to proceed with the CS-based service.

According to a variant of the embodiment described above, the UE 800 may not signal, to the MME, that the UE will switch to the 2G/3G network, through the NAS message. Instead, the UE may deliver the signaling to the eNB through an RRC message (i.e., a message different from the NAS message), and the eNB may in turn deliver the same to the MME.

More specifically, the UE may inform, through an RRC message (e.g., RRC connection request or RRC connection setup complete), that the UE will switch to the 2G/3G network to proceed with the CS-based service, and then may switch to the 2G/3G network after receiving a response to the information. Once the eNB receives the information from the UE, the eNB delivers the information to the MME through an S1 AP message. Subsequent operations of the MME and the SGW/PGW are the same as those illustrated in FIG. 8.

When congestion occurs in a Radio Access Network (RAN) (hereinafter, congestion of the RAN indicates congestion of an RAN or specific cell controlled by an eNB), it may be preferable to signal this event to a core network (CN) so as to perform optimized traffic processing. To apply traffic control for each UE, bearer, or service according to congestion, the CN needs to recognize UEs located in a RAN in which congestion is occurring.

More specifically, an embodiment of the present disclosure takes into account the following situation.

When a RAN node recognizes occurrence of congestion in the RAN and reports occurrence of the congestion to a RAN Congestion Awareness Function (RCAF), the RCAF may collect the report and deliver congestion information to a PCRF along with an identifier (e.g., cell ID) of the congested RAN. If the PCRF desires to apply traffic control or policy control per UE, user service or bearer, the PCRF needs to recognize UEs located in the RAN in which congestion is occurring. To this end, according to an embodiment of the present disclosure, the PCRF delivers the identifier of the congested RAN to a PCEF (internal function of a PGW). Hereinafter, this term will be interchangeably used with PGW. Then, the PCEF makes a request to the MME for User Location Information (ULI) reporting along with the identifier of the RAN, and the MME may start ULI reporting on UEs included in the requested RAN.

The LI reporting may occur immediately after the request is made or every time the location of the UE changes.

Figure 9:
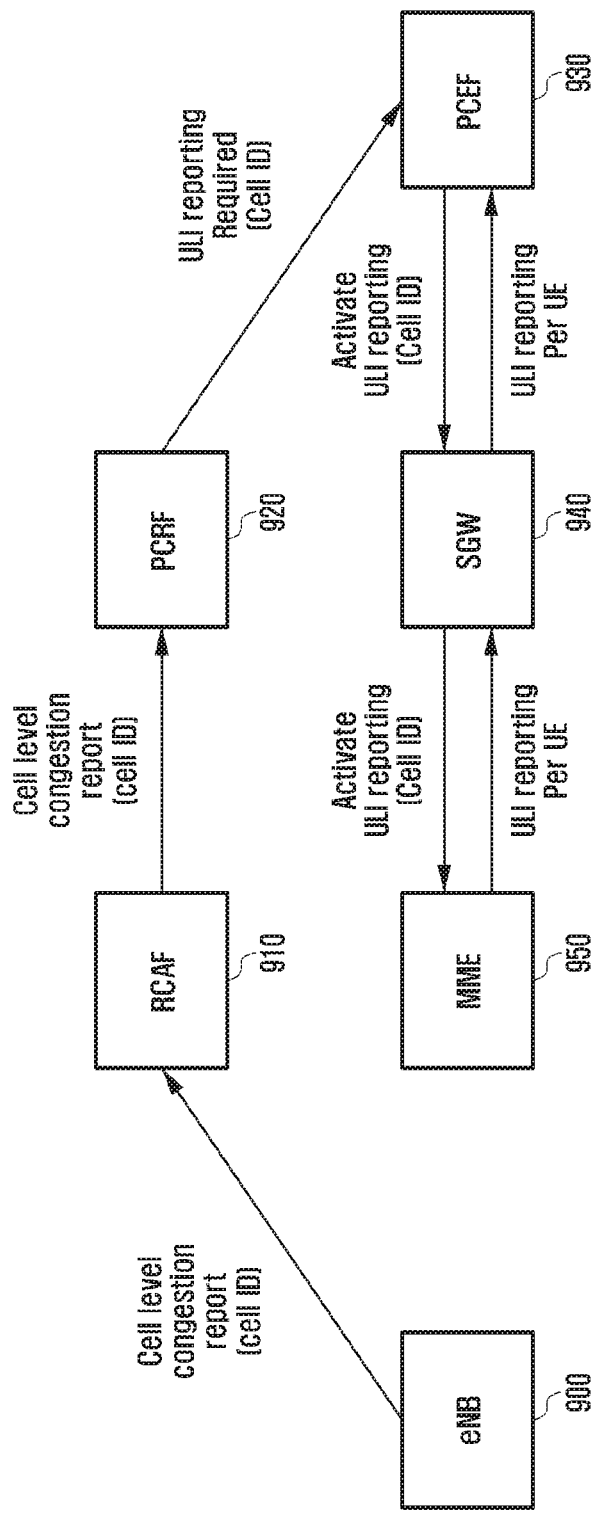
FIG. 9 illustrates a method for activating ULI reporting on a UE present in a specific RAN according to an embodiment of the present disclosure.

FIG. 9 illustrates a method for activating ULI reporting on a UE present in a specific RAN according to an embodiment of the present disclosure.

Suppose that a RAN node (which may be an eNB 900 in the figure) has recognized occurrence of RAN congestion. Then, the eNB 900 may report indication information indicating occurrence of congestion to an RCAF 910 along with the identifier (e.g., cell ID) of the RAN in which congestion has occurred.

Then, the RCAF 910 may collect the information and deliver the congestion information to a PCRF 920 along with the identifier (e.g., cell ID) of the RAN in which congestion has occurred.

If the PCRF 920 desires to apply traffic control or policy control eper UE, user service or bearer, the PCRF 920 needs to recognize UEs located in a RAN in which congestion is occurring. To this end, the PCRF 920 may deliver, to a PCEF 930, a request message for making a request for activating ULI reporting on UEs located in a specific RAN.

The message may include an identifier of the RAN (e.g., Cell ID) and information on time (e.g., a time value) for which the request is valid.

Upon receiving the request, the PCEF 930 may transmit, to S-GWs 940, a request message for making a request for activating ULI reporting. This request message may also include an identifier of the RAN (cell ID) and information on time (e.g., a time value) for which the request is valid.

Upon receiving the message, the S-GW 940 may deliver the information to MMEs 950. The MME 950 receiving the information recognizes UEs located in the requested RAN, and starts ULI reporting on the UEs.

If the request message contains time information, ULI reporting is allowed to be applied only for the time, and is deactivated after sending a ULI report as soon as a specific UE leaves the requested RAN.

According to another embodiment of the present disclosure, the aforementioned problem may be solved if the PCRF delivers, to the PCEF, the identifier of a RAN in which congestion has occurred, and the PCEF obtains a list of UEs located in the RAN, and then activates ULI reporting on the UEs. The ULI reporting may be performed when a request therefor is received or every time the location of the UE changes.

Figure 10:
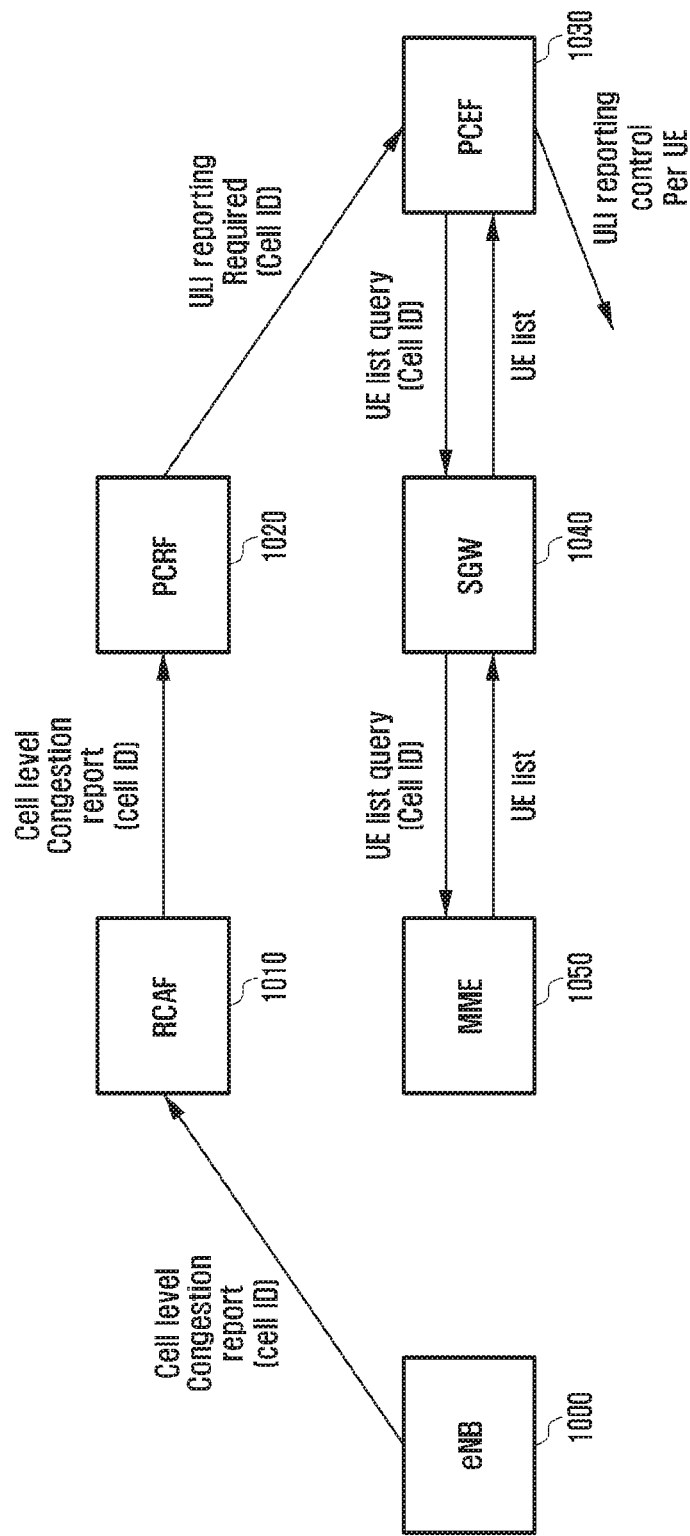
FIG. 10 illustrates a method for activating ULI reporting on a UE present in a specific RAN according to another embodiment of the present disclosure.

FIG. 10 illustrates a method for activating ULI reporting on a UE present in a specific RAN according to another embodiment of the present disclosure.

Suppose that a RAN node (which may be an eNB 1000 in the figure) has recognized occurrence of RAN congestion. Then, the eNB 1000 may report, to an RCAF 1010, indication information indicating that congestion has occurred along with an identifier (e.g., Cell ID) of a RAN in which congestion has occurred.

Then, the RCAF 1010 may collect the information and deliver the congestion information to a PCRF 1020 along with the identifier (e.g., cell ID) of the RAN in which congestion has occurred.

If the PCRF 1020 desires to apply traffic control or policy control per UE, user service or bearer, the PCRF 1020 needs to recognize UEs located in the RAN in which congestion is occurring. To this end, the PCRF 1020 may deliver, to a PCEF 1030, a request message for making a request for activating ULI reporting on UEs located in a specific RAN. The request message may contain an identifier of the RAN (e.g., Cell ID) and information on time (e.g., a time value) for which the request is valid.

Upon receiving the request, the PCEF 1030 may transmit, to S-GWs 1040, a message for making a request for a list of UEs belonging to the RAN including the identifier of the RAN. The request message may contain a period of reporting the list of UEs and information on time (e.g., a time value) for which the request is valid.

Upon receiving the request message, the S-GW 1040 may deliver the information to MMEs 1050. The MME 1050 receiving the information may recognize UEs located in the requested RAN, and create a list of identifiers of the UEs. Then, the MME 1050 may deliver the created list to the S-GW 1040 through a message sent to the S-GW 1040.

Reporting such list of UEs may periodically occur if the request message delivered via the S-GW 1040 includes a period. In addition, if a valid time is included in the request message, the reporting may be applied until the valid time expires.

The list of UEs created and reported by the MME 1050 may be finally delivered to the P-GW (PCEF) 1030 via the S-GW 1040. The PCEF 1030 may recognize UEs included in the congested RAN based on the information, and also dynamically activate ULI reporting to recognize the position information on the UEs.

According to another embodiment of the present disclosure, the aforementioned problem may be solved using another method. More specifically, when the PCRF delivers, to the PCEF, the identifier of the RAN in which congestion has occurred, the PCRF may make a request for reporting RAN Congestion Information (RCI) via GTP (GPRS Tunneling Protocol)-C/GTP-U, and the PCEF may make a request to a RAN node for RCI reporting on the UEs belonging to the RAN. Thereby, the problem may be solved.

The activated RCI reporting may be performed immediately after the request is received or every time the location of a UE changes, and may be terminated when a specific UE moves to an uncongested RAN.

Figure 11:
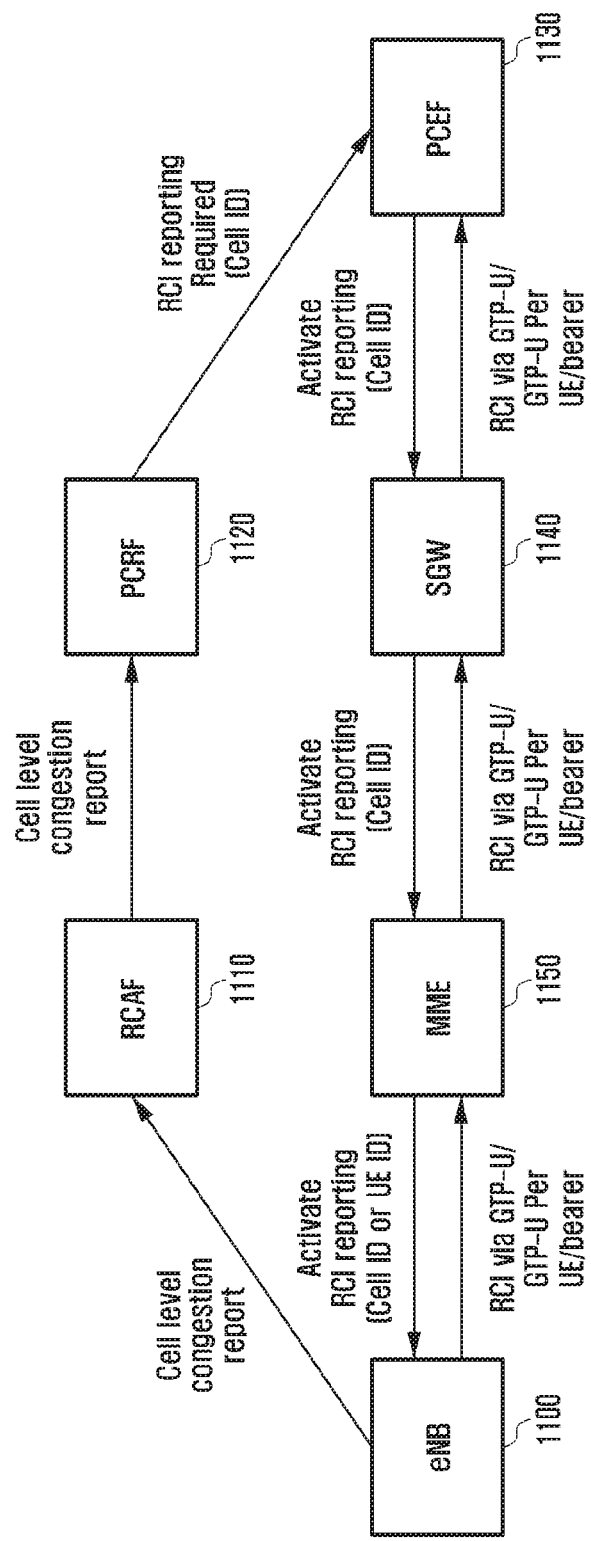
FIG. 11 illustrates a method for activating RCI reporting on a UE present in a specific RAN according to another embodiment of the present disclosure.

FIG. 11 illustrates a method for activating RCI reporting on a UE present in a specific RAN according to another embodiment of the present disclosure.

A RAN node (which may be an eNB 1100 in the figure) recognizes occurrence of RAN congestion, and reports, to an RCAF 1110, information indicating that congestion has occurred along with an identifier (e.g., Cell ID) of a RAN in which congestion has occurred.

Then, the RCAF 1110 may collect the information and deliver the congestion information to a PCRF 1120 along with the identifier (e.g., cell ID) of the RAN in which congestion has occurred. If the PCRF 1120 desires to apply traffic control or policy control per UE, user service or bearer, the PCRF 1120 needs to recognize UEs located in the RAN in which congestion is occurring, and additionally needs to recognize more specific congestion information for each user/bearer/service.

To this end, the PCRF 1120 may deliver, to a PCEF 1130, a request message for making a request for activating RCI reporting on UEs located in a specific RAN. The message may contain an identifier of the RAN (e.g., Cell ID) and information on time (e.g., a time value) for which the request is valid. The RCI may include identifiers of the UEs, a RAN identifier, congestion state information (a congestion level, occurrence of congestion, etc.).

Upon receiving the request, the PCEF 1130 may deliver a message for making a request for activating RCI reporting on UEs present in the RAN, using a GTP-C message. This request may include valid time information and a reporting period mentioned above.

The request is delivered from the PCEF 1130 to a S-GW 1140 via the GTP-C message, and is in turn delivered from the SGW 1140 to an MME 1150. Then, the MME 1150 may insert the information in an S1AP message transmitted to the RAN node. In particular, the MME 1150 may use the received RAN identifier to transmit, only to a RAN matching the identifier, a request for starting RCI reporting.

The RAN node receiving the message may recognize UEs located in the requested RAN, and start RCI reporting on the UEs. If the request message contains time information, the RCI reporting is allowed to be applied only for the time, and is deactivated after sending a last RCI report as soon as a specific UE leaves the requested RAN.

Such RCI may use a user data packet (e.g., GTP-U header or IP header) transmitted on uplink, or may be inserted in a separate S1-AP message (when the eNB delivers the RCI to an MME) and a GTP-C message (when the MME delivers the RCI to an S-GW, and the S-GW delivers the same to a P-GW).

The embodiment described above includes a process of a one network node (e.g., RAN Congestion Awareness Function (RCAF)) making a request to another network node (e.g., an MME) for information for determining UEs located in a congested cell and receiving the information.

In addition, in the embodiment described above, description has been given of a situation in which messages are delivered via intermediate nodes (a PCRF, a PGW, or an SGW) when one network node makes a request for information to another network and receives a response.

It should be noted that main points of the embodiments described above may also be applied to a case where a direct connection (a reference point or an interface) is established between one network node and another network node, and messages are directly transmitted and received therebetween without an intermediate node.

Hereinafter, a detailed description will be given of another embodiment of the present disclosure described above, namely, an embodiment in which one network node has a direct connection to another network node and directly transmits and receives a message, with reference to the drawings.

Figure 12:
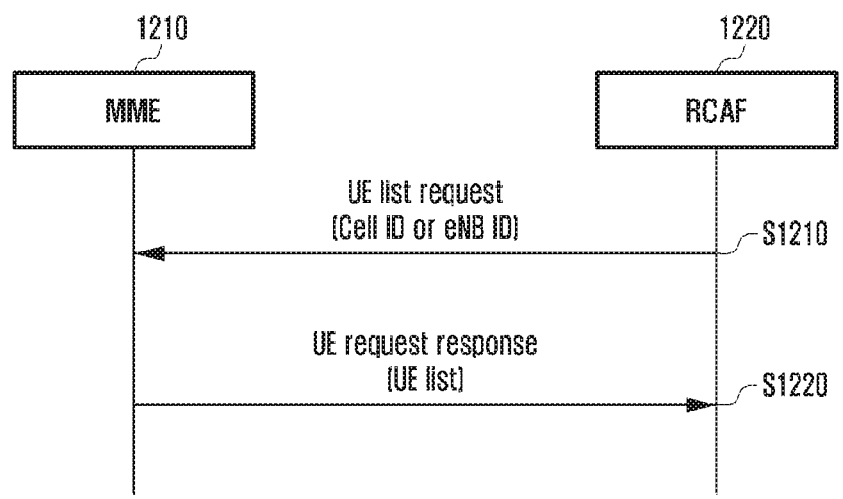
FIG. 12 is a flowchart illustrating an operation of exchanging a message between two network nodes to identify UEs located in a congested cell (or eNB) according to an embodiment of the present disclosure.

FIG. 12 is a flowchart illustrating an operation of exchanging a message between two network nodes to identify UEs located in a congested cell according to an embodiment of the present disclosure.

A network node (hereinafter, an RCAF 1220) needs to identify UEs located in a specific cell (or eNB). This need may occur when the network node recognizes occurrence of congestion in the specific cell (or eNB), or a specific condition (e.g., a certain time unit) is satisfied.

As shown in FIG. 12, the RCAF 1220 may transmit, to another network node (hereinafter, an MME 1210), a request message for requesting UE information in step S1210. The message may be a UE information request or IMSI/APN information request message. The message may include an identifier for identifying a selected area. The area identifier may be a Cell ID or an eNB ID. The message may additionally include an identifier for identifying a selected operator, for example, a selected PLMN ID. If a RAN is shared by multiple operators, the operator identifier (PLMN ID) may be used to receive information on a UE registered in a specific operator. The message may be a request message employing a Diameter protocol. In this case, the identifier for identifying the selected area may be included in the message as a part of Attribute-Value-Pair (AVP).

The MME 1210 may transmit a response message to the RCAF 1220 in step S1220. The message includes an ID list of UEs located in the selected area (cell, eNB) included in the request message. The IDs for identifying the UEs may be IMSIs. If the request message received in the previous step includes the selected PLMN ID, the MME may include only UEs registered in the selected PLMN (i.e., only UEs for which the selected PLMN or registered PLMN is identical to the requested PLMN) in the list. In addition, the UE information may include a registered PLMN ID of the UE.

In this case, the MME 1210 may perform a separate location report process together with an eNB in order to identify UEs located in a specific area. The aforementioned message may be a response message using the Diameter protocol, for example, a UE information response or IMSI/APN information response message, and the user ID information may be included in the message as a part of AVP.

The RCAF 1220 may identify UEs located in an area in which congestion has occurred, using the received information. When necessary, the RCAF 1220 may use the information in determining UE congestion information (RAN congestion information) to be delivered to another network node (e.g., a PCRF).

Meanwhile, if congestion control is applied only to a specific service, exchanging congestion information on UEs having other services may not only cause unnecessary signaling, but also increase processing load in network nodes. For example, if a main cause of congestion occurring in a network is traffic transmitted and received through an EPS bearer using QoS Class Identifier (QCI) 9 or 6, and congestion control is applied to the traffic, it is not necessary to deliver congestion information on a UE having another EPS bearer, for example, a UE having only an EPS bearer using QCI 5. That is, the RCAF 1220 may determine whether or not to deliver congestion information based on a combination of one or more information items (APN, QCI, ARP) of a UE received from the MME 1210, thereby reducing unnecessary signaling and processing load.

Figure 13:
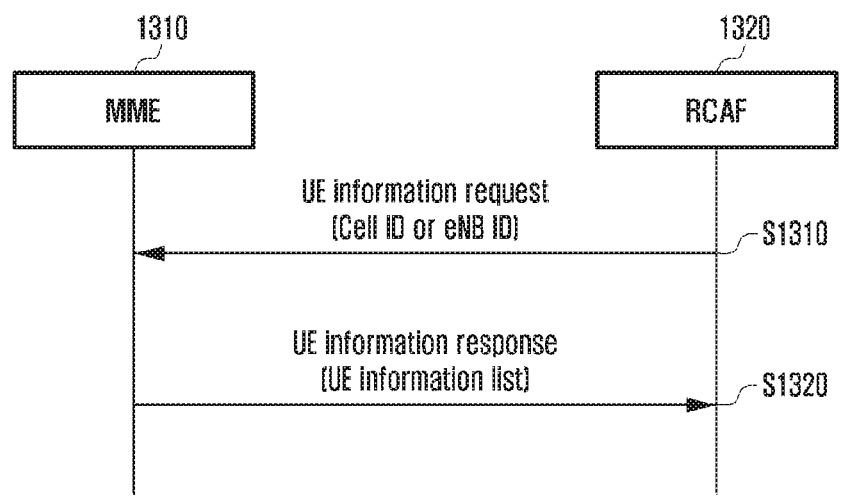
FIG. 13 is a flowchart illustrating an operation of exchanging a message between two network nodes to identify UEs located in a congested cell (or eNB) and information on a PDN connection of each UE.

FIG. 13 is a flowchart illustrating an operation of exchanging a message between two network nodes to identify UEs located in a congested cell (or eNB) and information on a PDN connection of each UE.

A network node (hereinafter, an RCAF 1320, which is a node to collect congestion information and deliver the same to another node) needs to identify information on UEs located in a specific cell (or eNB). This need may occur when the network node recognizes occurrence of congestion in the specific cell (or eNB), or a specific condition (e.g., a certain time unit) is satisfied.

The RCAF 1320 may transmit, to another network node (hereinafter, an MME 1310), a request message for requesting UE information in step S1310. The message may be a UE information request or IMSI/APN information request message. The message may include an identifier for identifying a selected area. The area identifier may be a Cell ID or an eNB ID. The message may additionally include an identifier for identifying a selected operator, for example, a selected PLMN ID. If a RAN is shared by multiple operators, the operator identifier (PLMN ID) may be used to receive information on a UE registered in a specific operator. The message may be a request message employing a Diameter protocol. In this case, the identifier for identifying the selected area may be included in the message as a part of AVP.

The MME 1310 may transmit a response message to the RCAF 1320 in step S1320. The message includes an ID list of UEs located in the selected area (cell, eNB) included in the request message and a list of UE information. The IDs for identifying the UEs may be IMSIs, and UE information for each IMSI may be included in the message. If the request message received in the previous step includes the selected PLMN ID, the MME may include only UEs registered in the selected PLMN (i.e., only UEs for which the selected PLMN or registered PLMN is identical to the requested PLMN). In addition, the UE information may include a registered PLMN ID of the UE.

In particular, the UE information may be PDN connection or EPS bearer-related information, and an APN, a QCI of an EPS bearer and an ARP of the EPS bearer may be used as the information.

If the EPS bearer information is used, the selected EPS bearer may be a default bearer of the PDN connection. If the UE has two or more PDN connections or two or more EPS bearers, the message may contain all information for each PDN connection or EPS bearer.

Meanwhile, the MME 1310 may perform a separate location reporting process together with an eNB in order to identify UEs located in a specific area. The aforementioned message may be a response message using the Diameter protocol, for example, a UE information response or IMSI/APN information response message, and the user ID information and the UE information may be encoded using AVP and included in the message.

The RCAF 1320 may identify UEs located in an area in which congestion has occurred, using the IDs of UEs in the received information. When necessary, the RCAF 1320 may use the IDs of UEs in determining UE congestion information (RAN congestion information) to be delivered to another network node (e.g., a PCRF).

The RCAF 1320 may select a PCRF proper for each UE using APNs used by UEs in the received information. The RCAF 1320 may control delivery of congestion information using the EPS bearer information (QCIs or ARPs) used by UEs in the received information. That is, the RCAF 1320 may determine whether or not to transmit congestion information to another network node (e.g., the PCRF) and a transmission period, using the EPS bearer information (QCIs or ARPs) used by UEs in the received information.

For example, if a QCI of an EPS bearer of a UE has a specific value (e.g., QCI 9 or QCI 6), the RCAF 1320 may deliver the congestion information to the PCRF. Otherwise, the RCAF 1320 may not deliver the congestion information.

Alternatively, the RCAF 1320 may use APN information in determining whether or not to deliver the congestion information to the PCRF. For example, if the APN information is an APN for a well-known IMS service or VoLTE, the RCAF 1320 may not deliver the congestion information. Alternatively, if the APN information is an APN for best effort or a typical Internet service, the RCAF 1320 may deliver the congestion information. Of course, the RCAF 1320 may determine whether or not to deliver the congestion information to the PCRF based on a combination of APN, QCI and ARP information.

If UEs located in a congested cell do not change, or UE information does not change, exchange of a message between the RCAF and the MME may result in unnecessary signaling and increase in processing load.

According to an embodiment of the present disclosure, the RCAF may subscribe UE information reporting (or notification) to an MME along with a notification condition, and the MME may report UE information to the RCAF when the notification condition is satisfied, even if the RCAF does not request the UE information. Thereby, unnecessary message exchange may be prevented, and processing load in the RCAF may be reduced.

Figure 14:
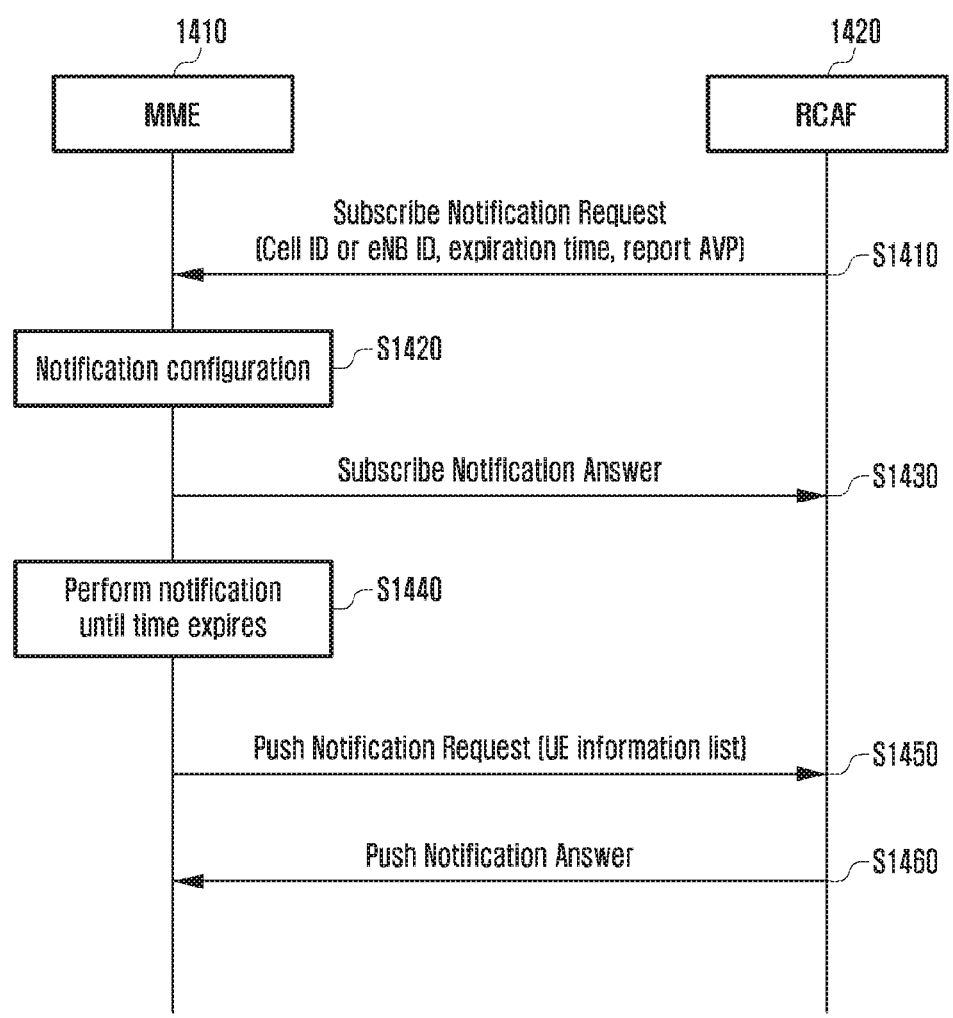
FIG. 14 is a flowchart illustrating a message exchange process for activating notification to periodically receive UE information.

FIG. 14 is a flowchart illustrating a message exchange process for activating notification to periodically receive UE information.

A network node (hereinafter, an RCAF 1420, which is a node to collect congestion information and deliver the same to another node) registers notification for receiving information on UEs located in a specific cell (or eNB). This operation may be performed when the network node recognizes occurrence of congestion in the specific cell (or eNB), or a specific condition (e.g., a certain time unit) is satisfied.

The RCAF 1420 may transmit, to another network node (hereinafter, an MME 1410), a request message for registering UE information notification in step S1410. The message may be a Subscribe Notification Request message. The message may include an identifier for identifying a selected area. The area identifier may be a Cell ID or an eNB ID. The message may additionally include an identifier for identifying a selected operator, for example, a selected PLMN ID. If a RAN is shared by multiple operators, the operator identifier (PLMN ID) may be used to receive information on a UE registered in a specific operator.

The message may further include an identifier for identifying a selected UE. In particular, an IMSI may be used as the identifier.

The message may further include time information indicating a time for which a notification request is valid or a time at which the requested notification operation expires.

The message may also include conditions for performing the notification operation such as, for example, a time period of occurrence of notification when periodic notification is needed, or a condition that information on a UE located in a selected area changes (e.g., a new UE enters the selected area or an existing UE moves out to another area).

The message may be a request message using the Diameter protocol. In this case, the information or the conditions are encoded using AVP.

Then, the MME 1410 may configure notification in step S1420, and transmit a response message to an RCAF 1430 in step S1430. In this case, a message indicating that notification has been registered may be a Subscribe Notification Answer message using the Diameter protocol.

Thereafter, the MME 1410 determines whether to perform the notification operation according to the configured notification information, and performs a notification process together with the RCAF 1420 if the conditions are met.

If an expiration condition for the notification operation is received from the RCAF 1420 in the notification configuration process, the MME 1410 perform notification only by the notification operation expiration time.

If a notification condition is included in the notification configuration process, the MME 1410 performs notification only if the notification condition is satisfied.

A message used for notification may contain a list of UE IDs and UE information. The IDs for identifying the UEs may be IMSIs, and UE information for each IMSI may also be contained in the message. If the request message received in the previous step includes a selected PLMN ID, the MME may include only UEs registered in the selected PLMN (i.e., only UEs for which the selected PLMN or registered PLMN is identical to the requested PLMN) in the list. In addition, the UE information may include a registered PLMN ID of the UE.

Herein, the UE information that the MME 1410 delivers to the RCAF 1420 may include only information on UEs changed after the information transmitted to the RCAF for the last time, or include information on all UEs located in the selected area.

If the MME 1410 transmits only updated information to the RCAF 1420, the RCAF 1420 may update, delete or add a part of the information stored therein using the updated information.

If the MME 1410 transmits information on all UEs located in the selected area to the RCAF 1420, the RCAF 1420 replaces the information stored therein with the received information.

Meanwhile, the message may be a response message using the Diameter protocol, for example, a Push Notification Answer message, the UE ID information and the UE information may be encoded using AVP and included in the message.

Figure 15:
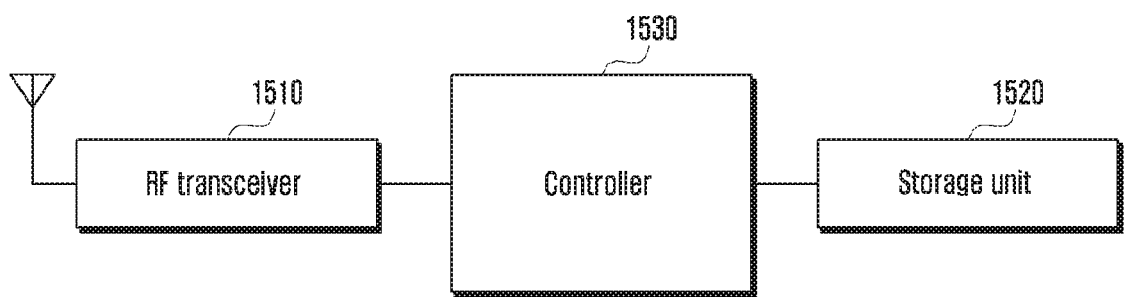
FIG. 15 is a block diagram illustrating the internal structure of a UE according to an embodiment of the present disclosure.

FIG. 15 is a block diagram illustrating the internal structure of a UE according to an embodiment of the present disclosure. As shown in FIG. 15, the UE of the present disclosure may include an RF transceiver 1510, a storage unit 1520, and a controller 1530.

The RF transceiver 1510 serves to transmit and receive data for wireless communication of the UE. The RF transceiver 1510 may include an RF transmitter to up-convert and amplify the frequency of a transmitted signal and an RF receiver to low-noise amplify a received signal and down-convert the frequency of the signal. The RF transceiver 1510 may receive data over a radio channel, output the data to the controller 1530, and transmit data output from the controller 1530 over a radio channel.

The storage unit 1520 stores a program and data which are needed for operation of the UE.

The controller 1530 controls signal flows between blocks such that the UE can operate according an embodiment of the present disclosure. For example, when the controller 1530 senses CSFB triggering, the controller 1530 may check CS security key-related information. The controller 1530 may also control a call setup process for a CS domain based on the CS security key-related information such that the process is performed.

In addition, the controller 1530 may control a series of processes for checking CS security key-related information transmitted from a CN node of the mobile communication system. The controller 1530 may also control the UE to generate the CS security key-related information from PS security key-related information that the UE has used in a security procedure for a packet exchange domain.

In addition to the embodiment given above the controller 1530 may control the UE such that the UE operates according to another embodiment of the present disclosure.

Figure 16:
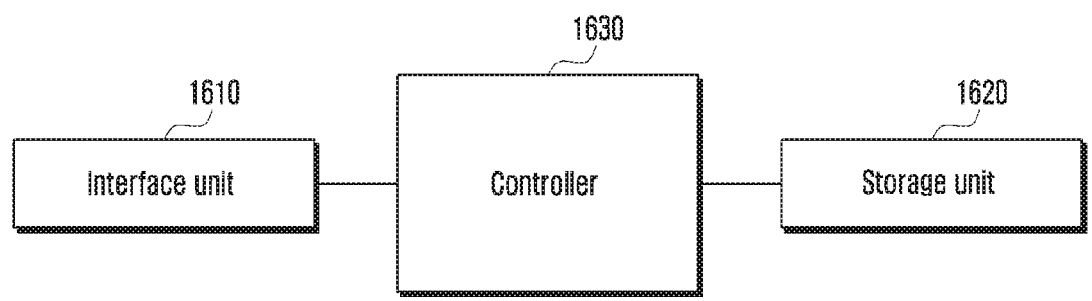
FIG. 16 is a block diagram illustrating the internal structure of a CN node according to an embodiment of the present disclosure.

FIG. 16 is a block diagram illustrating the internal structure of a CN node according to an embodiment of the present disclosure. As shown in FIG. 16, a CN node of the present disclosure may include an interface unit 1610, a storage unit 1620, and a controller 1630. In this case, the CN node may include an MME.

The interface unit 1610 may serve to perform signal processing for wired communication of the CN node.

The storage unit 1620 stores a program and data which are necessary for operation of the CN node.

The controller 1630 controls signal flows between blocks such that the CN node can operate according to an embodiment of the present disclosure. For example, the controller 1630 may generate security key-related information for the UE to use in a circuit switched fallback, (CSFB) procedure. In addition, the controller 1630 may control to transmit the generated CS security key-related information to a control node (e.g., MSC/VLR) of the CS domain. In this case, the controller 1630 may control generate the CS security key-related information in the process of registration of the UE in the packet exchange domain or at the time an extended service request message transmitted from the UE according to triggering of CSFB in the UE is received.

In addition, the controller 1630 may transmit the CS security key-related information to the UE. In addition, if changed CS security key-related information is received from the control node of the CS domain, the controller 1630 may control to transmit the received changed CS security key-related information to the UE.

If the CN node is an RCAF, the controller 1630 may control to receive congestion related information from at least one eNB.

In addition, the controller 1630 may control to transmit, to the MME, a UE information request message for requesting information on a UE corresponding to the eNB, based on the congestion related information, and to receive a UE information response message containing information on the UE corresponding to the eNB from the MME.

The controller 1630 may transmit the information on the UE corresponding to the eNB to another CN node.

In this case, the controller 1630 may control to transmit the UE information request message directly to the MME or transmit the UE information request message to the MME via at least one CN node. The UE information request message may contain an identifier for identifying a requested area, and the identifier may include at least one of a cell ID and eNB ID. The UE information response message may contain a list of UEs served by the eNB, and the identifier for identifying the UE may include an International Mobile Subscriber Identity (IMSI).

If the core network node is an MME, the controller 1630 may receive, from the CN node, a UE information request message for requesting information corresponding to at least one eNB in which congestion has occurred. Then, the controller 1630 may check information on a UE corresponding to the eNB, and transmit, to the core network, a UE information response message containing information on the UE.

In the above-described embodiments, all steps may be selectively performed or part of the steps and may be omitted. In each embodiment, the steps are not necessarily performed in accordance with the described order and may be rearranged.

The messages need not always be transmitted in order and transmission orders of the messages may be changed. The steps and message transmission operations may be independently performed Hereinabove, various embodiments of the present disclosure have been shown and described for the purpose of illustration without limiting the subject matter of the present disclosure. It should be understood by those skilled in the art that many variations and modifications of the method and apparatus described herein will still fall within the spirit and scope of the present disclosure as defined in the appended claims and their equivalents.

What is claimed is:

1. A method for controlling congestion by a radio access network (RAN) congestion awareness function (RCAF) in a mobile communication system, the method comprising:
    receiving congestion information associated with a base station or a cell;
    transmitting, to a mobility management entity (MME), a first message for requesting information on at least one user equipment (UE) served by a congested base station or a congested cell based on the congestion information, the first message including an identifier of a public land mobile network (PLMN) and an identifier of the congested base station or an identifier of the congested cell; and
    receiving, from the MME, a second message including the information, the information including a list of at least one identity (ID) of the at least one UE that is served by the congested base station or the congested cell and corresponds to the PLMN.

2. The method of claim 1, wherein an identifier for the at least one UE includes an international mobile subscriber identity (IMSI).

3. The method of claim 1, wherein the list of at least one ID of the at least one UE is obtained by the MME based on a location report procedure between the MME and the congested base station or the congested cell.

4. The method of claim 1, wherein the transmitting of the first message comprises:
    transmitting the first message to the MME directly or via at least one core network node.

5. A method for controlling congestion by a mobility management entity (MME) in a mobile communication system, the method comprising:
    receiving, from a radio access network (RAN) congestion awareness function (RCAF), a first message for requesting information on at least one user equipment (UE) served by a congested base station or a congested cell, the first message including an identifier of a public land mobile network (PLMN) and an identifier of the congested base station or an identifier of the congested cell;
    identifying the information including a list of at least one identity (ID) of the at least one UE that is served by the congested base station or the congested cell and corresponds to the PLMN; and
    transmitting, to the RCAF, a second message including the information in response to the first message.

6. The method of claim 5, wherein an identifier for the at least one UE includes an international mobile subscriber identity (IMSI).

7. The method of claim 5,
    wherein the list of at least one ID of the at least one UE is obtained by the MME based on a location report procedure between the MME and the congested base station or the congested cell.

8. The method of claim 5, wherein the first message is directly received from the RCAF or the first message is received via at least one core network node.

9. A radio access network (RAN) congestion awareness function (RCAF) for controlling congestion in a mobile communication system, the RCAF comprising:
a transceiver; and
a controller configured to:
receive, via the transceiver, congestion information associated with a base station or a cell,
transmit, via the transceiver to a mobility management entity (MME), a first message for requesting information on at least one user equipment (UE) served by a congested base station or a congested cell based on the congestion information, the first message including an identifier of a public land mobile network (PLMN) and an identifier of the congested base station or an identifier of the congested cell, and
receive, via the transceiver from the MME, a second message including the information, the information including a list of at least one identity (ID) of the at least one UE that is served by the congested base station or the congested cell and corresponds to the PLMN.

10. The RCAF of claim 9, wherein an identifier for the at least one UE includes an international mobile subscriber identity (IMSI).

11. The RCAF of claim 9, wherein the list of at least one ID of the at least one UE is obtained by the MME based on a location report procedure between the MME and the congested base station or the congested cell.

12. The RCAF of claim 9, wherein the controller is configured to transmit the first message to the MME directly or via at least one core network node.

13. A mobility management entity (MME) for controlling congestion in a mobile communication system, the MME comprising:
a transceiver; and
a controller configured to:
receive, via the transceiver from a radio access network (RAN) congestion awareness function (RCAF), a first message for requesting information on at least one user equipment (UE) served by a congested base station or a congested cell, the first message including an identifier of a public land mobile network (PLMN) and an identifier of the congested base station or an identifier of the congested cell,
identify the information including a list of at least one identity (ID) of the at least one UE that is served by the congested base station or the congested cell and corresponds to the PLMN, and
transmit, via the transceiver to the RCAF, a second message including the information in response to the first message.

14. The MME of claim 13, wherein an identifier for the at least one UE includes an international mobile subscriber identity (IMSI).

15. The MME of claim 13, wherein the list of at least one ID of the at least one UE is obtained by the MME based on a location report procedure between the MME and the congested base station or the congested cell.

16. The MME of claim 13, wherein the first message is directly received from the RCAF or the first message is received via at least one core network node.

* * * * *